United States Patent [19]

Lamb

[11] 4,272,341

[45] Jun. 9, 1981

[54] PROCESS FOR RECOVERY OF METAL VALUES FROM LEAD-ZINC ORES, EVEN THOSE HAVING A HIGH CARBONATE CONTENT

[75] Inventor: Frank E. Lamb, Tucson, Ariz.

[73] Assignee: Duval Corporation, Houston, Tex.

[21] Appl. No.: 110,569

[22] Filed: Jan. 9, 1980

[51] Int. Cl.³ .......................... C25C 1/16; C25C 1/18; C25B 1/02
[52] U.S. Cl. .................................... 204/118; 204/98; 204/128; 204/129; 204/117; 75/109; 423/105; 423/165; 423/419 R; 423/430; 423/544
[58] Field of Search ................. 204/98, 128, 129, 118, 204/117; 75/109; 423/105, 165, 544, 419, 430

[56] References Cited

U.S. PATENT DOCUMENTS

| | | | |
|---|---|---|---|
| 1,069,498 | 8/1913 | Barenscheer | 75/113 |
| 1,173,467 | 2/1916 | Barenscheer | 75/113 |
| 1,251,485 | 1/1918 | De Luce | 204/117 |
| 1,441,063 | 1/1923 | Christensen | 75/114 |
| 1,456,798 | 5/1923 | Hannay | 204/117 |
| 3,743,501 | 7/1973 | Cusanelli et al. | 75/109 |
| 3,785,944 | 1/1974 | Atwood et al. | 204/107 |
| 3,879,272 | 4/1975 | Atwood et al. | 204/107 |
| 3,929,597 | 12/1975 | Cottam et al. | 204/66 |
| 3,973,949 | 8/1976 | Goens et al. | 75/112 |
| 3,986,943 | 10/1976 | Lamb | 204/105 R |
| 4,181,588 | 1/1980 | Wong | 204/117 |

Primary Examiner—R. L. Andrews
Attorney, Agent, or Firm—Millen & White

[57] ABSTRACT

A chemical, electro-chemical process for recovering meta values from a zinc- or lead-containing material comprises:

in a solubilization stage, oxidizing the zinc- or lead-containing material by treating said material with a ferric chloride leach solution;

when solubilized lead is present, separating it from the pregnant liquor forming an essentially lead free solution;

dividing this essentially lead free solution into two portions;

passing one portion of the essentially lead free solution into the anolyte compartment of a Zn° producing electrolysis stage for use as the ferrous ion-containing anolyte thereof;

separating iron from the second portion of the essentially lead free solution, forming an essentially iron free solution;

passing the essentially iron free solution into the catholyte compartment of said Zn° producing electrolysis stage for use as the catholyte thereof;

conducting electrolysis in said Zn° producing electrolysis stage, thereby regenerating ferric chloride leach solution in the anolyte by oxidizing ferrous ions to ferric ions, and reducing zinc ions in the catholyte to Zn°; and recovering the Zn° produced in the electrolysis stage.

In a preferred embodiment, the process is adapted to metal recovery from high-carbonate containing ores by use of a multi-step solubilization stage including an acidulation step and a carbonation stage wherein cations such as Mg and Ca are removed from the process liquor.

42 Claims, 14 Drawing Figures

PROCESS FOR RECOVERY OF METAL VALUES FROM LEAD-ZINC ORES, EVEN THOSE HAVING A HIGH CARBONATE CONTENT

BACKGROUND OF THE INVENTION

This process relates generally to a chemical, electrochemical method for production of metallic lead and/or zinc and other metals from materials, e.g., ores, including high carbonate ores, containing them usually in the form of their sulfides. The new process avoids conventional environmental and technological disadvantages.

Primarily, lead and zinc ores consist of their respective sulfides, galena and sphalerite, along with minor quantities of oxidation products, oxides, hydroxides, silicates and carbonates and, in the case of lead, the sulfate anglesite. Complex assemblages of the lead-zinc minerals are common due both to physical and chemical reasons, and the presence of carbonate minerals within and surrounding these deposits is not an infrequent occurrence.

Often separation of the sulfide minerals from gangue components and from each other is not satisfactorily achievable by physical and mechanical methods such as application of gravity separation and flotation technologies. In many instances, mineral grain sizes are far too small for such operations, and intergrowth of dissimilar grains within each other are frequently noticed. Separations by such techniques are further complicated by substitution of one metal cation for a portion of another in a given mineral lattice as, for example, iron for zinc forming a mineral species known as marmitite. The presence of copper levels far above solubility capabilities within sphalerite mineral crystals has also been observed.

Conventionally, the lead and zinc ores are concentrated and/or separated by using physical or mechanical methods such as flotation or gravity separation techniques and subsequently roasted with elimination of the contained sulfur as oxidic gas. The roasted concentrates are then reduced to their respective metals by high temperature reduction techniques or by electro-deposition after dissolution in spent electrolyte.

Roasting of sulfide containing concentrates generally means that the contained sulfur is contained in product sulfuric acid or eliminated as a by-product, such as calcium sulfate if air quality regulations and standards are to be met. The disposal of large amounts of either of these materials may present additional problems both economically and environmentally.

Additionally, separation of sulfide minerals from gangue components and from each other is often not satisfactorily accomplished by these physical or mechanical methods. In many cases, mineral grain sizes are too small for such operations and complex inner growths of dissimilar grain structures within each other further complicate the situation. Separations by such methods are further hindered by the substitution of other metal cations into portions of the metal lattice normally reserved for such ions as zinc.

Feedstock chemical purity for lead and zinc roaster concentrates is important for reasons of operational performance and metal loss considerations. Severe penalties are generally imposed for contamination as, for example, by the presence of the other metal or iron.

In commonly assigned U.S. Pat. No. 3,986,943, a chemical process for recovery of metal values from antimony, zinc and/or lead ores and ore concentrates by reaction with a solution containing hydrochloric acid is disclosed. In this process, the leaching step is conducted under atmospheric boiling conditions and the hydrogen sulfide evolved is separately oxidized to elemental sulfur utilizing ferric chloride containing solutions.

Hydrometallurgical process technology covering production of copper from chalcopyrite and other copper-containing materials utilizing ferric chloride solutions is disclosed in commonly assigned U.S. Pat. Nos. 3,785,944 and 3,879,272. In both patents, copper-containing materials are oxidized using ferric chloride-containing solutions producing soluble cupric chloride and elemental sulfur. Cupric chloride is then reacted with additional elemental sulfur. Copper values are recovered from solution by electrodeposition, and regeneration of the ferric chloride is achieved by oxidation using oxygen or an oxygen-containing gas such as air with concurrent purge of excess iron from the leach solution. The effect of combining the ferric chloride oxidation and solution regeneration with an advantageous reduction in iron content of the process solution is specifically noted in U.S. Pat. No. 3,879,272.

A hydrometallurgical process for recovery of antimony from stibnite and other antimony-containing materials by reaction with ferric chloride in an aqueous solution is disclosed in commonly assigned U.S. Pat. No. 3,986,943. In this process, antimony-containing materials are reacted with ferric chloride solution production antimony (III) chloride and elemental sulfur. Antimony metal is recovered by electrodeposition at the cathode of a diaphragm equipped electrolytic cell with ferric chloride regeneration being simultaneously achieved in the anolyte compartment.

Moreover, the deliberate treatment of carbonate minerals such as limestone, dolomite and ankerite with chloride-containing solutions whose active ingredients include ferric chloride or hydrochloric acid has generally been avoided in the past because of reactions resulting in precipitation of the iron values and neutralization of the acid. Accordingly, recovery of metal values from ores containing large amounts of carbonates, has been technologically and economically unfeasible heretofore.

Consequently, large tonnage, relatively high grade deposits of lead-zinc containing ores, especially those wherein the gangue minerals include large amounts of carbonates, cannot by known technology be economically separated from the sulfidic metal values.

The following U.S. Pat. Nos. disclose technology related to that of this invention: 1,251,485, 1,435,891, 1,441,063, 1,456,798, 3,929,597, 1,069,498, 1,173,467, 3,743,501 and 3,973,949.

SUMMARY OF THE INVENTION

Accordingly, it is an object of this invention to provide a chemical, hydrometallurgical process for recovering zinc and/or lead values from materials containing the same, whereby environmental pollution problems, especially those due to sulfur-containing impurities, such as sulfur oxides, are minimized, e.g., air pollution involved in conventional pyrometallurgical techniques, e.g., by removal of sulfur as $S°$.

It is another object of this invention to provide such a process which is applicable not only to ores wherein the metal values are primarily in the form of their sulfides, but also to those wherein a high carbonate content, e.g., carbonate of Ca, Mg, etc., is present.

It is a further object to provide such a process wherein the treating chemicals are regenerated and recycled, thereby rendering the process economical.

It is an additional object to provide such a process wherein the yield of metal values from the ores is essentially complete and the metals are obtained in high grade irrespective of metal contents, e.g., of lead to zinc or of the presence of iron values in the feed material.

Upon further study of the specification and appended claims, further objects and advantages of this invention will become apparent to those skilled in the art.

These objects have been attained by providing a chemical, electrochemical process for recovering metal values from a zinc sulfide or lead sulfide-containing material comprising:

in a solubilization stage, oxidizing the zinc- or lead-containing material by treating said material with a ferric chloride leach solution until there is substantial solubilization of the zinc or lead content of the material into said solution in the form of zinc or lead chloride, thereby also reducing ferric chloride to ferrous chloride and forming a pregnant liquor;

when solubilized lead is present, separating it from the pregnant liquor forming an essentially lead free solution;

dividing this essentially lead free solution into two portions;

passing one portion of the essentially lead free solution into the anolyte compartment of a $Zn°$ producing electrolysis stage for use as the ferrous ion-containing anolyte thereof;

separating iron from the second portion of the essentially lead free solution, forming an essentially iron free solution;

passing the essentially iron free solution into the catholyte compartment of said $Zn°$ producing electrolysis stage for use as the catholyte thereof;

conducting electrolysis in said $Zn°$ producing electrolysis stage, thereby regenerating ferric chloride leach solution in the anolyte by oxidizing ferrous ions to ferric ions, and reducing zinc ions in the catholyte to $Zn°$; and recovering the $Zn°$ produced in the electrolysis stage.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DISCUSSION

It has been found that the mentioned desirable objects can be accomplished and the difficulties of prior art processes can be obviated by the use of the process of this invention which has four basic stages which can be briefly categorized as metal solubilization, metal recovery, solution purification and solution regeneration.

Details regarding application of the process of this invention to a specific ore material, especially as regards the metal solubilization or leach stage, are determined by the chemical and/or physical composition and complexity of the ore. Generalizations are made below where applicable; however, exceptions to each will be encountered on a case by case basis. These can be readily recognized and appropriate adjustments made by the skilled worker by routine experiments on specific ore samples. For example, in the treatment of as-mined ore material, the metal solubilization stage may involve vat, heap or dump leaching installations charged with relatively coarse particle size materials. Leaching in these instances would desirably be accomplished under ambient conditions of temperature and pressure. In other applications, it may be possible and desirable to concentrate the metal values contained in the as-mined ore, for example, by the application of flotation or gravity separation techniques. For these concentrates, in addition, the use of stirred tank reactors may be considered since smaller quantities of material are to be treated and active volumes are reduced significantly for a given metal production level. Examples involving these several specific areas of application are included in the following descriptions.

OVERVIEW

Figure 1:
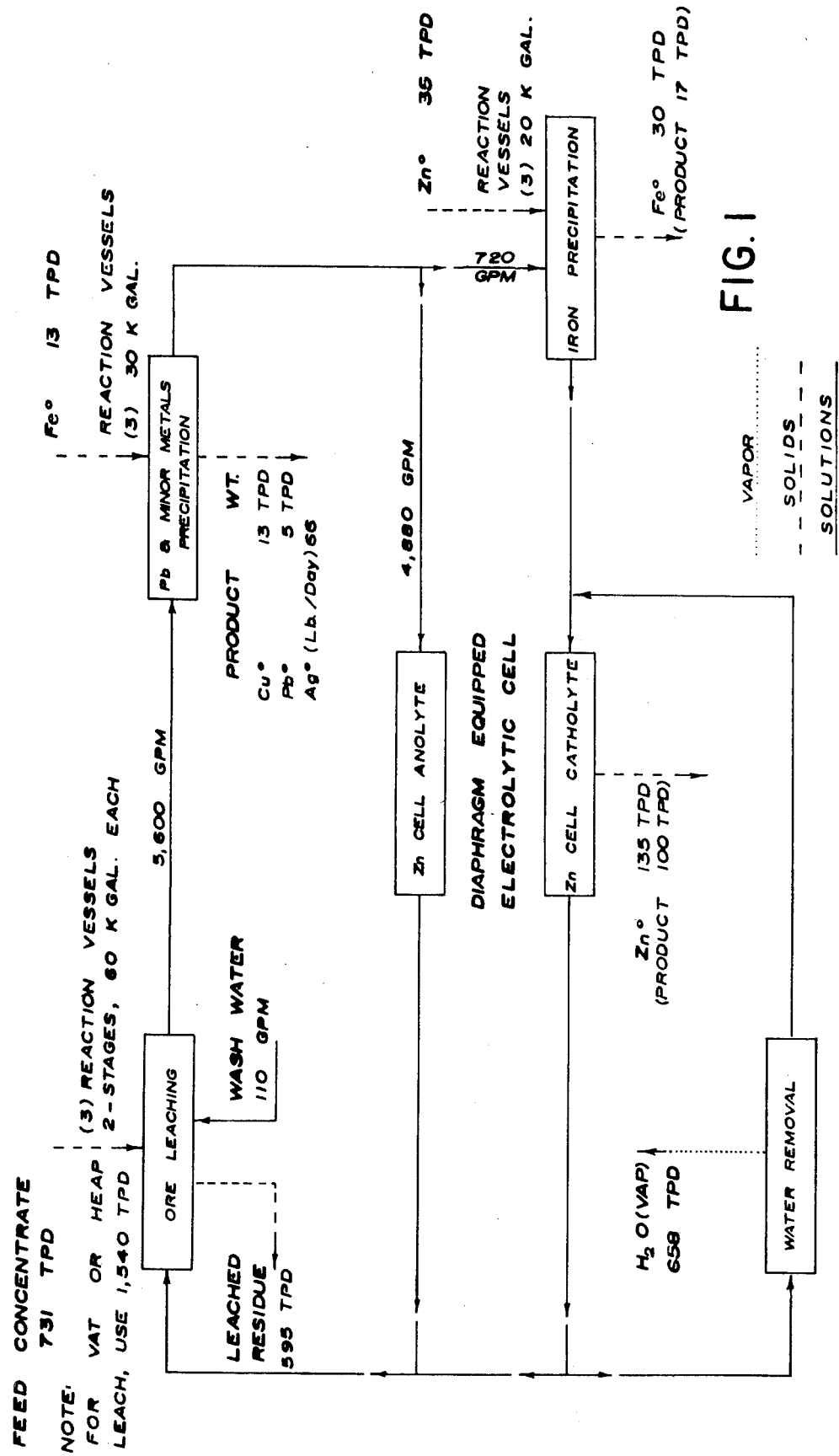
FIG. 1 is a simplified flow diagram including stoichiometric balance data illustrating the basic process of this invention as applied to a sulfidic ore containing zinc, copper and lead values.

FIG. 1 indicates schematically the application of this process to the recovery of zinc and lead along with certain minor metals contained in an ore or ore concentrate.

The metal solubilization or ore leaching stage involves exposing the material to an aqueous solution containing ferric chloride as the reactive ingredient. The lead and zinc sulfides react to form soluble lead and zinc chlorides respectively, and elemental sulfur, a residuum associated and remaining with the gangue minerals and insoluble materials (the sulfur can be collected and purified if desired); the ferric ion in solution is simultaneously reduced to the ferrous state. Metal solubilization reactions are often desirably carried out in two or more stages assuring maximum solubilization of valuable metals contained in the ore and simultaneously affording fullest utilization of process solution oxidizing capabilities.

Lead values along with contained minor elements such as copper and silver are subsequently removed from the pregnant liquor stream using, e.g., metallic iron as a precipitant. This portion of the metal recovery stage, being contained in the primary process loop, permits the more soluble zinc chloride level to be adjusted without dependence on the less soluble lead chloride content and simultaneously allows controllable enhancement of the concentration of ferric chloride.

A portion of the process liquor stream emanating from the minor metals precipitation step is used as feed for the iron and zinc recovery portions of the metal recovery stage, while the remaining portion is circulated through the anolyte system of the zinc electrodeposition cells for solution regeneration. In the latter stage, the ferrous ion is reoxidized to ferric at the anode, and the regenerated solution is recycled for additional metal solubilization.

That portion of the lead-free process liquor stream withdrawn as feed to the iron and zinc recovery portions of the process is introduced first into the iron precipitation stage wherein reaction with added metallic zinc is continued to effect substantially complete removal of iron from solution. Whereas the preceding leach and lead precipitation steps may have been conducted under ambient temperature conditions, the iron precipitation step is often desirably conducted at or near the atmospheric boiling temperature where economical. This temperature elevation not only provides for increased reaction rates and permits substantially complete removal of the iron from solution, but the sensible heat content of the solution usefully provides an energy source, e.g., for the subsequent water removal step.

The thus-treated liquor consisting essentially of zinc chloride, along with chlorides of metals such as sodium, potassium, calcium and/or magnesium, etc., is introduced into the circulating catholyte stream of the usually diaphragm equipped zinc electrolytic cells. Complete removal of zinc values from this stream is not necessary since the spent catholyte is returned to the process as part of the input leach solution. The chloride ion formerly associated in solution with the electrodeposited zinc is electrochemically passed through the diaphragm to supply the additional chloride ion concentration required in the anolyte stream for electrochemical balance due to the oxidation of the ferrous ion to the ferric state. Metallic zinc may be deposited cathodically in the form of sheets or granules, but foil is usually the preferred depositional form as will be hereinafter discussed.

The above simplified description summarizes the basic process for treatment of an ore or ore concentrate with simultaneous production of metal values. It features completely cyclical operation and elimination of gangue materials, all in a manner consistent with provision for maximum protection of the environment. A detailed discussion of each of the process stages follows, along with a description of several adaptations and modifications for certain specific applications, e.g., the selective removal of lead from zinc containing ores and treatment of carbonate-containing ores.

(1) Metal Solubilization Stage

The metal solubilization stage may be carried out under widely varying conditions. As mentioned, the most appropriate conditions for any given application can be readily determined by a skilled worker by routine experiments. For example, the following solubilization stage conditions are often employable.

The ferric chloride ($FeCl_3$) leach solution generally has a chloride ion concentration of about 3.5 to about 20% by weight, preferably 15-17%. The amount of leach solution employed is generally sufficient to supply adequate reactant and provide for solubility of metal chlorides. Lead, if present, is generally the least soluble at 0.1 to 0.3 percent by weight, thus necessitating the use of approximately 700-2000 gallons per ton of ore having a Pb content of 1% by weight, i.e., generally the leach solution contains a stoichiometric excess of $FeCl_3$ with respect to the active metals in the ore, e.g., 1-2 moles of $FeCl_3$ per mole of active metals, depending on the valence of said reactive metals. The leach solution treatment is often conducted for 20-180 days, preferably 30-60 days to achieve a satisfactory solubilization of Pb/Zn values, as well as other minor metals such as Ag and Cu, e.g. for a discussion of 90-100% of the contained metals depending highly on the nature of the ore structure and the desired recovery rate.

Ambient temperature and pressure can be employed. The foregoing general solubilization times are based on such ambient conditions. However, elevated temperature and/or pressure can also be used, in which case the ore or concentrate is generally finely divided and the above-mentioned times required for equivalent solubilizations are greatly reduced, e.g., from several days to a few hours. Such elevated temperatures can range from just above ambient temperature to 140° C., preferably 100°-140° C. Pressures often range from ambient to 6 atm, preferably 1-4 atm. Normally, elevated pressures are employed when it is necessary or desirable to operate the solubilization stage at a temperature above the atmospheric boiling point of the solubilization stage solution.

The solubilization stage can be carried out in conventional vats, heaps or dumps. Agitation of the solution under these conditions is not necessary. Similarly, the leaching step may be conducted under flow conditions, e.g., with the leach solution and the ore in cocurrent or countercurrent flow using fully conventional procedures and equipment. Typical flow rates are, as indicated above, dependent on transport of the least soluble component and delivery of sufficient reactant ($FeCl_3$) for completion of the extractive sequence.

One primary advantage of the process of this invention resides in the fact that the ore may be employed in as-mined condition without any pretreatments, e.g., to form a concentrate or to change particle size. However, of course, ore concentrates and lower particle size ores may also be used, often in conjunction with the more advantageous solubilization conditions mentioned above, e.g., using low volume optionally pressurized reactors, co- or countercurrent flow, etc. Additionally, smaller particle sizes generally increase reaction (dissolution) rates thus reducing reaction time requirements for the same yields from ores containing metal values in particularly complex, inaccessible chemical and/or physical structures incorporated within relatively unreactive gangue grains. In general, any particle size, e.g., of minus $\frac{3}{8}''$-400 mesh (fines) is employable; preferably, the particle sizes are minus 8 mesh for vat, pad or heap leach operations and minus 100 mesh for use in stirred tank reactors. Ores may be concentrated conventionally by any of many well-known techniques, e.g., by flotation or gravitation separation, etc. (See, for example, "Text Book of Ore Dressing", Richards and Locke, McGraw-Hill Book Company.) Additionally, any other conventional ore pretreatment (e.g., grinding, crushing) may be performed if economically or otherwise justified. (See, e.g., "Handbook of Mineral Dressing", Taggart - John Wiley and Sons, Inc.)

Generally, the process of this invention is applicable to any zinc- and/or lead-containing material, e.g., an ore thereof, irrespective of the physical or chemical structure involved. Typical such ores include, for example, sphalerite (Zns), Galena (Pbs) and marmatite (Zn,FeS) and oxidized ore minerals such as cerussite ($PbCO_3$), anglesite ($PbSO_4$), smithsonite ($ZnCO_3$) and zincite (ZnO). These may be admixed with other ore minerals containing valuable metals such as copper and silver and/or carbonate minerals including limestone, dolemite, calcite or ankerite.

The ore can be added to the solubilization stage slurried in any conventional aqueous medium, including, e.g., the pregnant liquor which is produced by the solubilization stage itself. The ore slurry generally contains the ore in an amount of 10–25 wt.% based on the total weight of the slurry.

Figure 2:
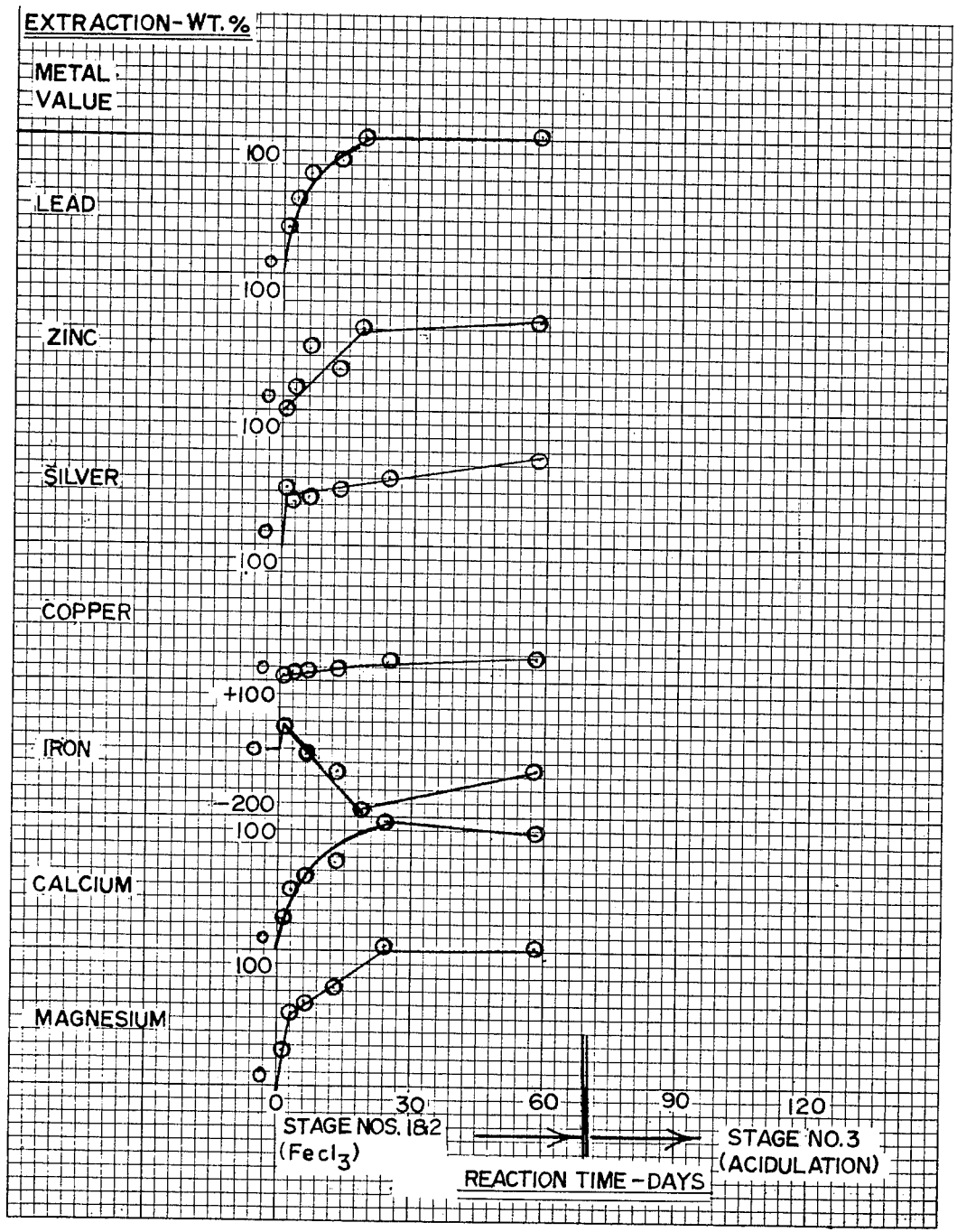
FIG. 2 illustrated leaching rate data for the metal values of a high carbonate ore (particle size: minus 8 mesh) under ambient conditions.
Figure 3:
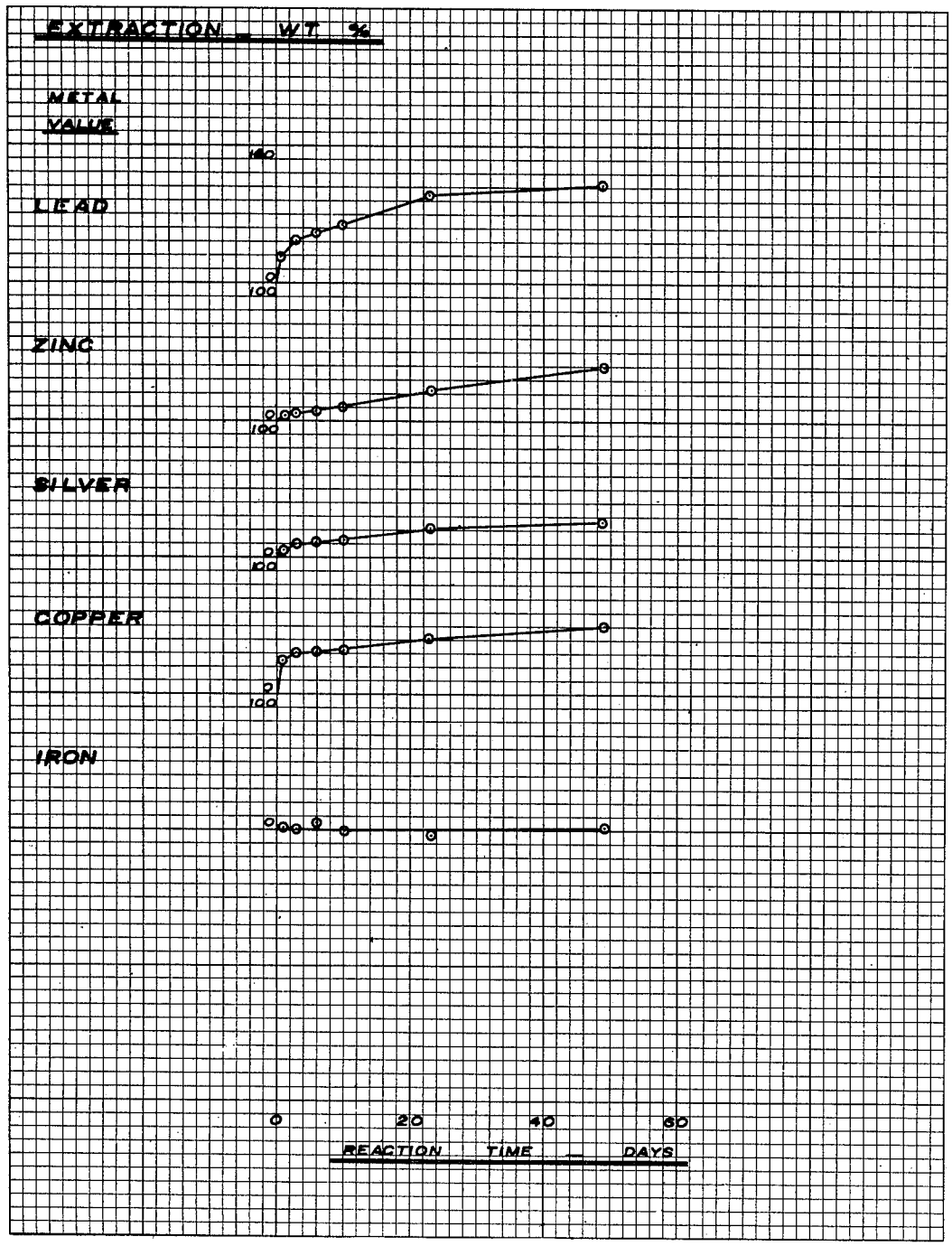
FIGS. 3 and 4 illustrate leaching rate data for the metal values of a massive sulfide ore (ambient conditions; particle size: minus 8 mesh and minus 400 mesh, respectively)
Figure 4:
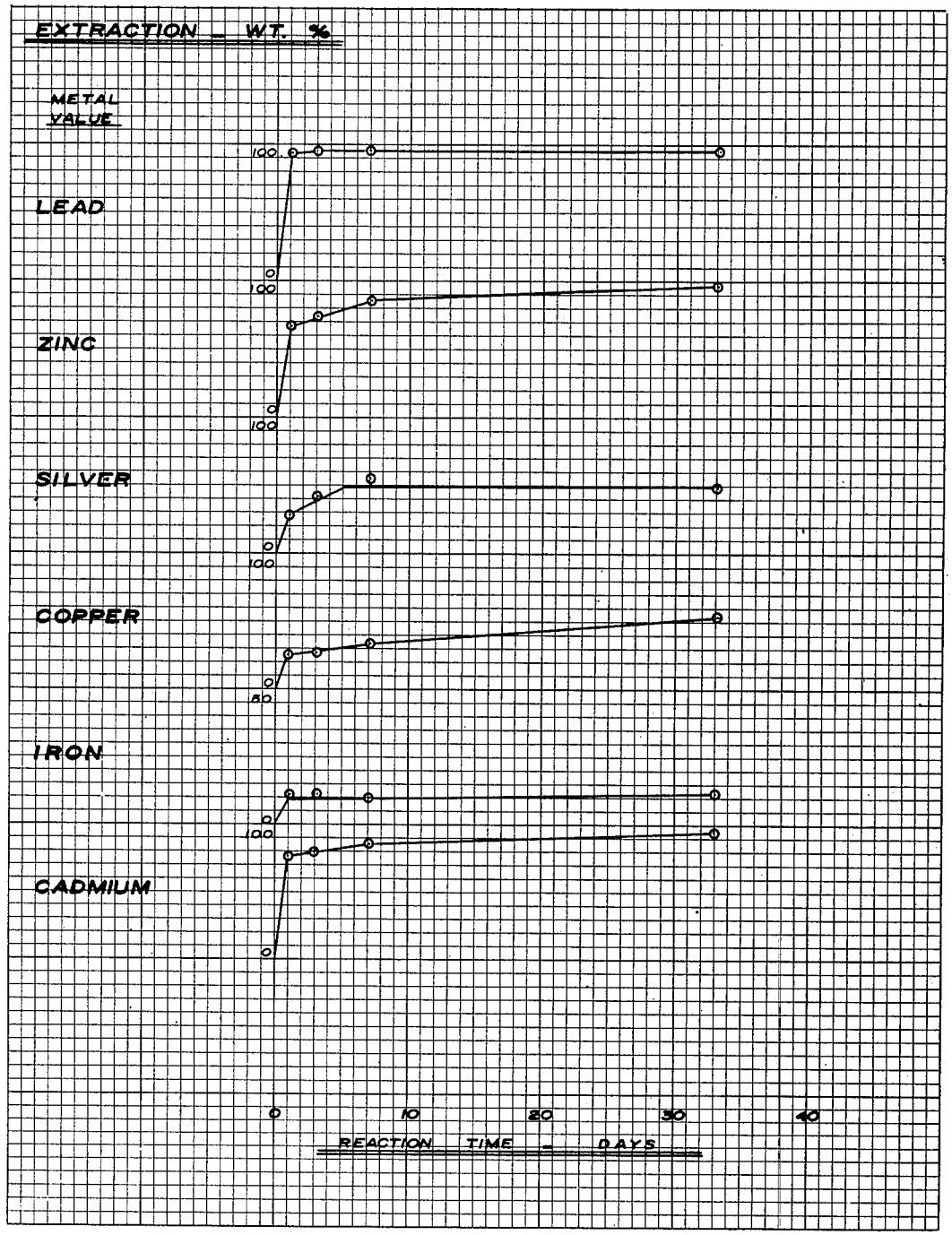
Figure 5:
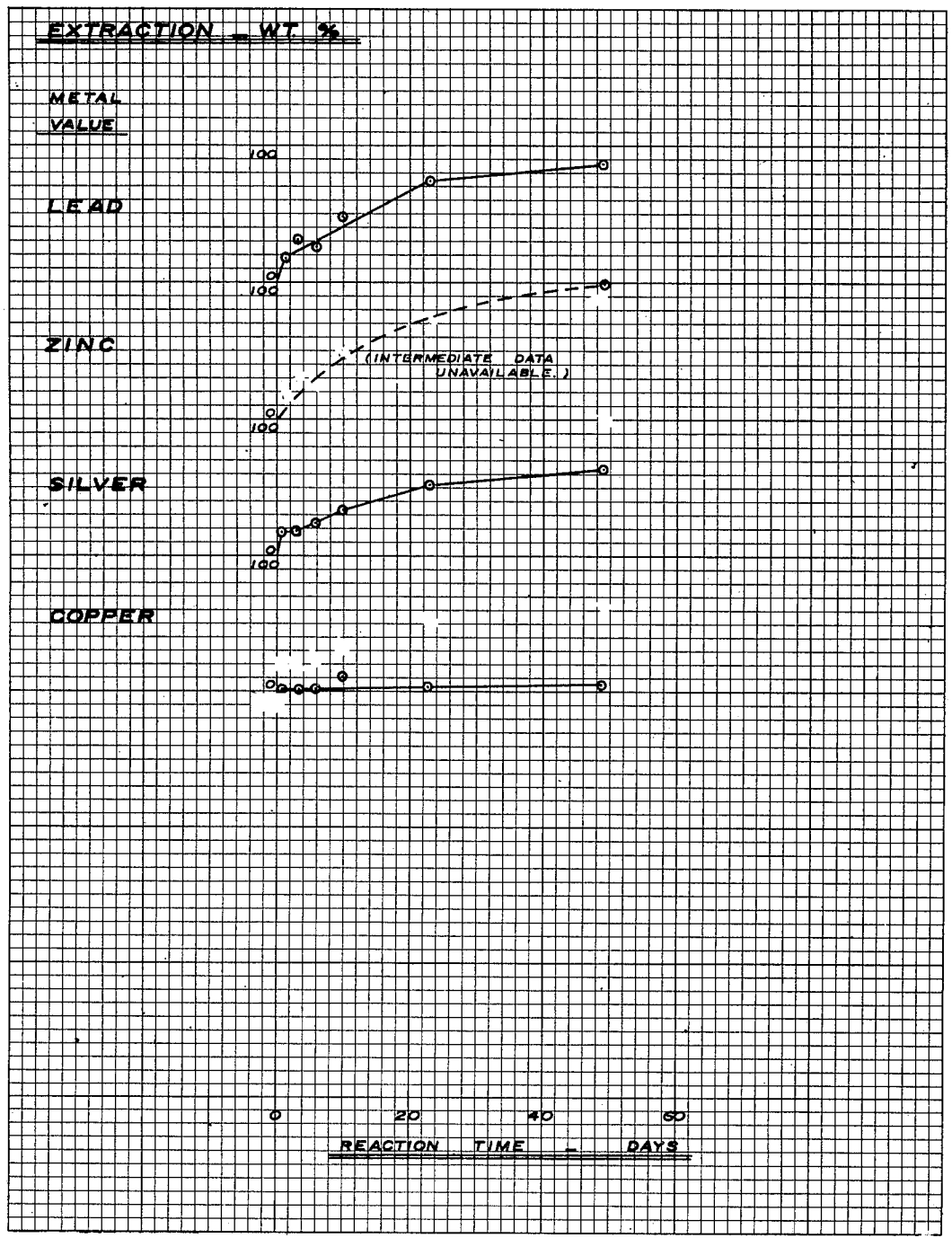
FIGS. 5 and 6 illustrate leaching rate data for the metal values in a second massive sulfide ore (ambient conditions; particle size: minus 8 mesh and minus 400 mesh, respectively)
Figure 6:
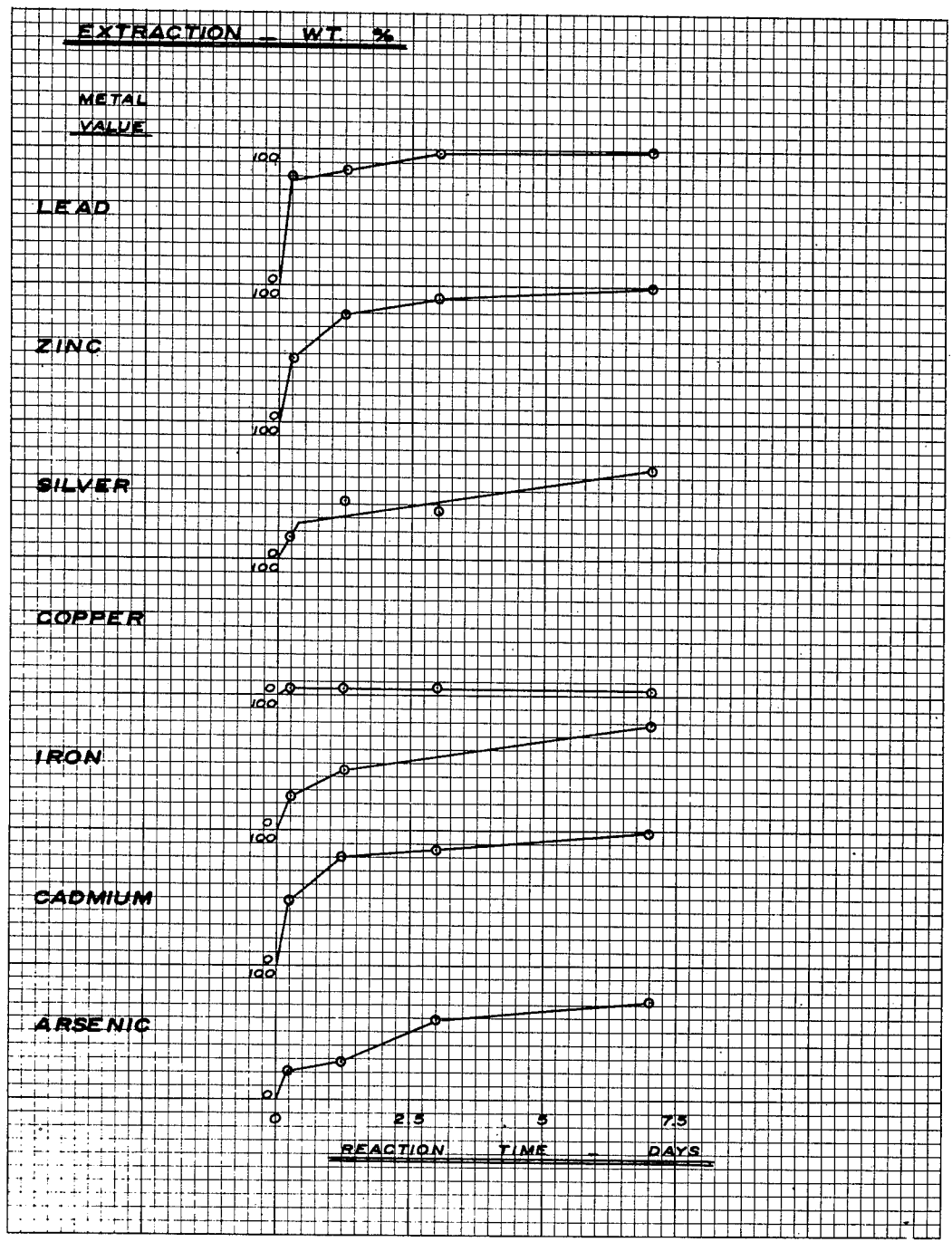

As noted above, the ore leaching or metal solubilization stage of the process may advantageously be carried out under ambient temperature conditions in vats, heaps or dumps without the necessity of fine grinding of the ore materials. For example, the fully acceptable dissolution rates achieved in this way for minus 8 mesh particles of a high carbonate containing lead-zinc ore and of two massive sulfide ores are shown in FIGS. 2, 3 and 5, respectively. Similar results for the same two massive sulfide ores of minus 400 mesh particle size are shown in FIGS. 4 and 6, respectively. These figures also demonstrate the types of easily accounted for variations in process results due to variations in ores and/or ore samples.

Figure 7:
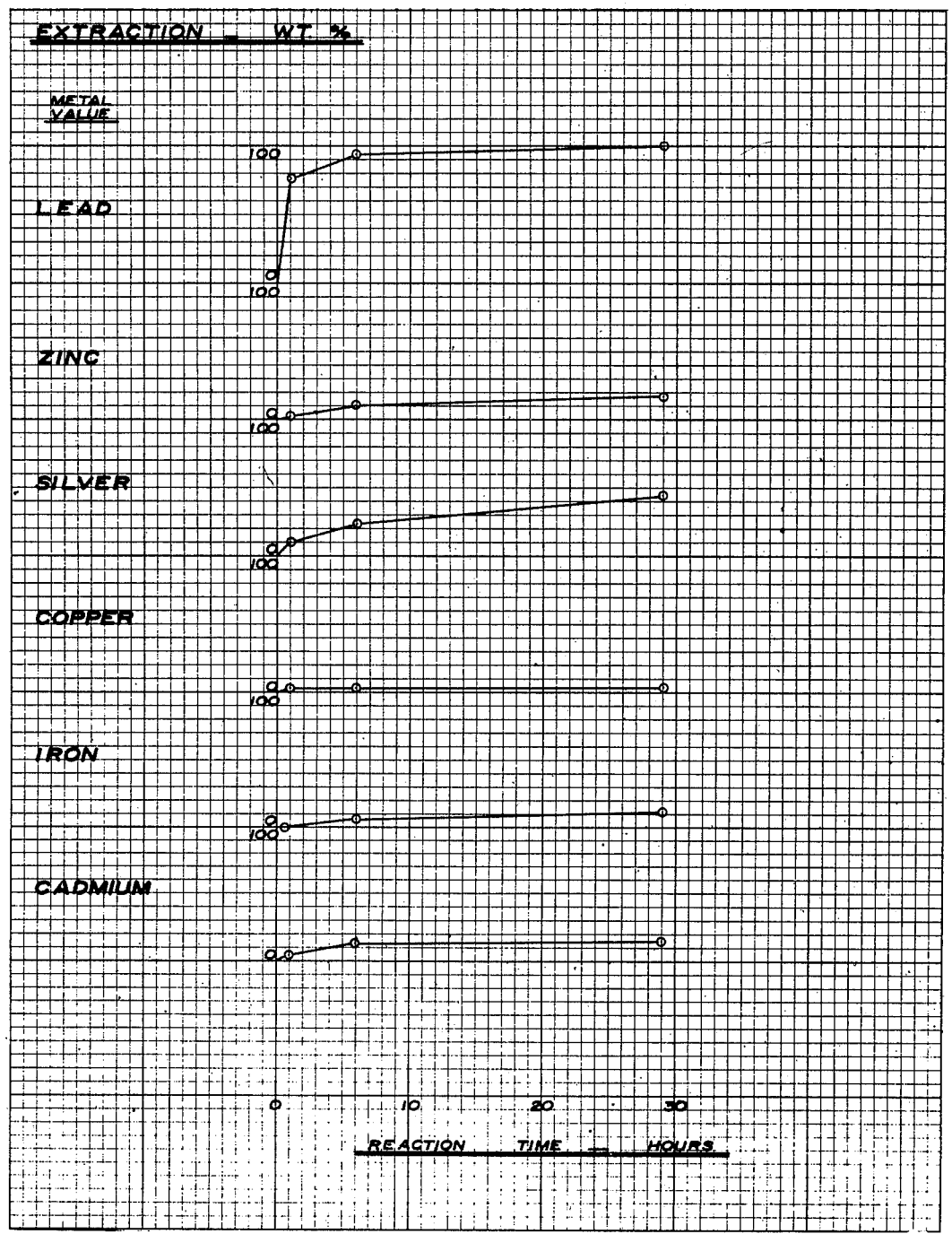
FIG. 7 illustrates leaching rate data for the metal values in a flotation concentrated zinc-containing ore (ambient conditions; minus 80 mesh)

Another such variation is demonstrated in FIG. 7, wherein the solubilized material is a zinc flotation concentrate. The extremely fast reaction rate for solubilization of the lead values from exposed galena or lead sulfide in this starting material under ambient conditions of this process step is very noticeable. This differential lead solubilization with respect to associated zinc and other metal sulfides contained in the feedstock and the rapidity thereof permits utilization of ambient temperature, stirred reactors for the metal solubilization stage for application of this process to the selective removal of lead values from a zinc-containing ore concentrate as shown in EXAMPLE 2 wherein the leach solution abstracts only 5.0% of the zinc content during the same time 98.0% of the lead content is being solubilized. Simultaneously, the lead content in the concentrate is lowered from 3.21% to 0.069%. This selective lead removal is accomplished, e.g., by controlling the time of solubilization to be sufficiently long to solubilize a substantially large part of the lead content but sufficiently short to solubilize only a minimal amount of the zinc. A suitable time period can be determined by routine experimentation. In this option, it may also be desirable to incorporate a conventional iron electrolysis stage to regenerate spent leach solution. That is, the lead-free solution, from which iron is removed by precipitation as described below, is instead used as the electrolyte of an iron electrolysis cell. As a result, the iron metal is produced and recovered and ferrous chloride is oxidized to ferric chloride thereby providing regenerated leach solution which can be recycled to the solubilization stage. A discussion of electrolytic processes for extraction and production of iron from ores is provided in "Hydrometallurgy of Base Metals" by George D. VanArsdale, McGraw-Hill Book Company, Inc.

While recognizing the advantageous application of the process of this invention to crushed (e.g., minus 4 mesh) as-mined ore materials and for selective removal of undesirable contaminants such as lead from zinc-containing ore concentrates under conditions of ambient temperature in the leaching stage, it is however, frequently more attractive economically to utilize the process to recover metal values from concentrates obtained, for example, by flotation of ore materials. Such a metal recovery application of the process of this invention for an ore concentrate having a composition essentially the same as that used in the process of EXAMPLE 2 is shown in detail in EXAMPLE 1 discussed below. Using the same ore concentrate described in EXAMPLE 2 for effecting sequential dissolution and separation of the lead contaminant, process conditions can be significantly varied to demonstrate the resultant effect on the process. For example, conducting the metal solubilization stage reactions under conditions of atmospheric boiling instead of ambient temperature, produces a significant enhancement of the solubilization of both zinc and lead values. Application of sufficient pressure to the reaction as, for example, by conducting the metal solubilization stage in a pressure vessel such as an autoclave, to elevate the boiling temperature to about 140° C., about the minimum viscosity point of molten sulfur, results in practically complete dissolution of contained metal values within a 30 minute reaction time period. Typical pressures under these conditions are about 40–50 psi.

As a vehicle for more thoroughly describing and exemplifying the solubilization stage of the process of this invention, attention is directed to EXAMPLE 1. Material selected as feedstock for the process of EXAMPLE 1, in order to illustrate its application to recovery of metal values, is a zinc flotation concentrate containing economically significant amounts of other metals including lead, copper, cadmium and silver. Individual particles present in the concentrate generally exhibit dimensions in the range of 100–200 microns, indicating minus 65 mesh plus 150 mesh in the Tyler Standard Sieve Series, nominal for a flotation concentrate. Table 1 contains the mineralogical occurrence of the elements of interest within the sample, and while each element is identified with discrete mineral phases, all identified phases can be found intergrown within single crystalline particulates.

TABLE 1

| Element | Mineral Phase |
| --- | --- |
| Copper | Chalcopyrite |
| Iron | Chalcopyrite, Pyrrhotite, Sphalerite |
| Lead | Galena |
| Cadmium | Sphalerite |
| Zinc | Sphalerite |
| Sulfur | Sulfides as listed above |

Sphalerite contained in the sample was marmatitic with rather homogeneous substitution of iron for zinc in the sphaleritic lattice. In this particular sample, the zinc-iron molar ratio in the sphalerite was 1:1. Occlusion of approximately 20 percent of the chalcopyrite within gangue mineral phases at this particle size was also observable.

With reference to EXAMPLE 1, fresh ore concentrate is introduced into the metal solubilization stage. The feedstock may be admixed with a suitable quantity of pregnant liquor and the resulting slurry pumped into the metal solubilization reactor. Leach liquor containing ferric chloride as the active lixiviant is also introduced.

In general, the sulfidic mineral species contained in the ore concentrate react with ferric chloride in solution producing a soluble metal chloride and elemental sulfur while simultaneously reducing ferric iron to the ferrous state. This reaction is shown generically in the following equation with M representing a divalent metal ion such as zinc, copper or lead, for example.

$$MS + 2FeCl_3 \rightarrow 2FeCl_2 + MCl_2 + S°$$

The effect of temperature on the extent that the above reactions will occur in a thirty minute retention period for this ore concentrate is shown in Table 2. Ambient temperature is defined as 20°–25° C. and atmospheric boiling for the test conditions was 99°–101° C.

TABLE 2

| | Solubilization - Wt.% (30 minutes) | | |
| --- | --- | --- | --- |
| Element | Ambient Temp. | Atmos. Boiling | 140° C. |
| Copper | 5 | 36 | 79 |
| Iron | 10 | 56 | 98 |
| Lead | 98 | 99 | 100 |
| Cadmium | 15 | 63 | 98 |
| Zinc | 5 | 64 | 98 |
| Silver | 50 | 84 | 98 |

The relatively low extraction value for copper was probably caused by occlusion of chalcopyrite mineral grains within nonreactive gangue mineral crystals. By further reducing the particle size of the ore concentrate to essentially minus 400 mesh Tyler or dimensionally below 38 microns, copper solubilization was increased to 99 percent by by weight.

Figure 8:
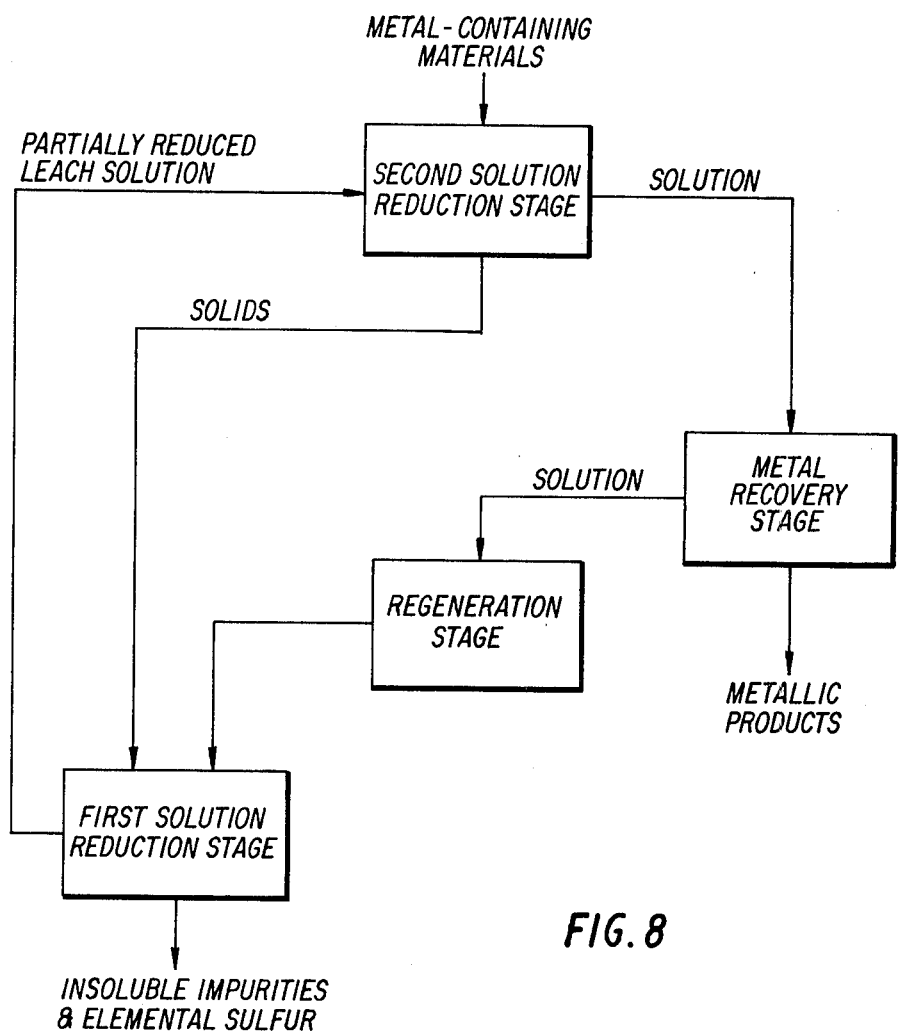
FIG. 8 schematically illustrates one form of the process of this invention wherein a two-stage solubilization is employed.

Advantageously for a number of reasons, the metal solubilization stage reactions may be conducted as a two (or more) step sequence rather than a single reaction step. Such a multi-step process can be carried out using conventional technology under conventional considerations and in accordance with the requirements of this invention. For example, such a multi-step adaptation of this process may be carried out using the technology of U.S. Pat. No. 3,986,943, whose disclosure is incorporated by reference herein. Such a process is schematically illustrated in FIG. 8. In such a process, counterflow of solids and liquors permits maximum utilization of the leaching capacity of the ferric chloride-containing solution by exposing partially reduced leach solution (e.g., the product of the second step) to highly reactive fresh ore concentrate in the first step. This minimization of ferric ion in the pregnant liquor has economically beneficial effects in succeeding metal recovery stages since complete reduction is achieved therein by consumption of metal precipitant. In the second step, partially leached ore concentrate is exposed to leach solution having a high concentration of ferric ion, e.g., regenerated leach solution from the electrolysis stages thereby maximizing extraction of contained metal values and increasing leaching efficiency.

Inspection of Table 2 shows that more than two-thirds of the metal solubilization reactions may be accomplished in a first step which could be conducted at atmospheric boiling temperature. A second step, using more costly pressure vessels in order to maintain an operating temperature of 140° C., could then be effected with equipment of relatively small size without sacrificing either retention time or leaching efficiency. In one general method for a two step implementation of the metal solubilization state, the reaction slurry of each step can be separated, for example, using a thickener for continuous flow circuits and settling tanks for batch processing. Pregnant liquor decanted from the reaction slurry of the second step (see FIG. 8) could be filtered to remove any suspended particulate matter prior to transferring to the lead and minor metals precipitation step of EXAMPLE 1. Final leached solids separated from the reaction slurry of the first solubilization step may be cleansed of adhering process solution by using a filter on which washing with water is possible before exiting the process. The washing solutions may be added to the recycling process liquor going to the first step.

Chloride ion concentration in the process liquors is not critical insofar as leaching capability is concerned since test runs have indicated levels as low as 3.5 percent by weight as $FeCl_3$ are effective and may advantageously be used, for example, in vat or heap leach applications. In the process circuit of this invention, reaction vessel size and circuit volumes tend to be important economically. This would suggest that higher chloride ion concentrations should be employed to permit smaller liquor volume flowrates for a given circuit productivity since ferric chloride is the active ingredient and more can be delivered per unit solution volume under these conditions. Solubility limitations generally restrict this value to approximately 13–18 percent chloride ion by weight.

As can be seen in the primary process loop of EXAMPLE 1, i.e., that cycle comprising metal solubilization, lead and minor metals precipitation and zinc anolyte, zinc and iron are introduced into the process liquor by solubilization and iron additionally as a precipitant. In general, for the process of this invention, for a given feedstock and circuit operational efficiency, the amounts of each of these metals added to the process liquors become essentially invariant values, determining process liquor compositions and circulation rates. However, in general, when the process of this invention is carried out in a continuous flow circuit, the flow rates in all portions of the process circuit may be varied at will to achieve desired process output, efficiencies, etc., in dependence on the usual diverse factors such as vat size, pumping equipment, solubilization and other reaction (e.g., precipitation) characteristics, etc. The wide range of flow rates which may be easily selected by skilled workers, e.g., employing where necessary routine preliminary tests and other fully conventional considerations, may be ascertained by inspection of the several figures herein where a wide diversity of typical flow rates are exemplified. A particular processing facility may be conventionally designed to accomodate feed rates from e.g., a few tens of tons to several thousands of tons per day containing lead and other reactive metals from a few percent to more than thirty percent; to cover all possible combinations, flow rates from say one hundred to many tens of thousands of GPM generally are involved.

Reference is made to EXAMPLE 1 and Table 3 below for an indication of the conventional interdependence of the various process variables on each other and, in particular, on the selected flow rate. The flow rates given in EXAMPLE 1 can be changed, for example, by recycling iron metal to the leach circuit, i.e., as input to the lead and minor metals precipitation step. However, of course, this is accomplished at the expense of increasing zinc production rates as shown in Table 3.

TABLE 3

| Iron Recycle Lb/Day | Solution Rate Approx.-GPM | Zinc Production Required-Lb/Day |
|---|---|---|
| 0 | 2,840 | 242,173 |
| 100,000 | 2,150 | 359,219 |
| 200,000 | 1,470 | 476,264 |
| 300,000 | 780 | 593,310 |

2. METAL RECOVERY STAGE

A. Lead and Minor Metals Precipitation

Pregnant liquor generated in the metal solubilization stage contains dissolved metal ions extracted from the feedstock and iron essentially in the ferrous state. This liquor is first introduced into the lead and minor metals precipitation stage.

In this stage, the minor metals contained in the ore and solubilized in the first process stage are removed from the process liquor, e.g., by precipitation, preferably by iron. Other reducing metals could be utilized, e.g. zinc metal, for selective precipitation of lead and minor metals, but iron preferentially is employed to enhance the amount of that element in the circulating primary process loop solutions which are based on a $FeCl_3$ leach system.

As for the solubilization and other stages of this invention, this metal recovery stage may be carried out under a wide range of conditions which vary for a given application and can be easily optimized by a skilled worker using, where necessary, routine experimentation. However, in general, these conditions may be selected as follows.

Figure 9:
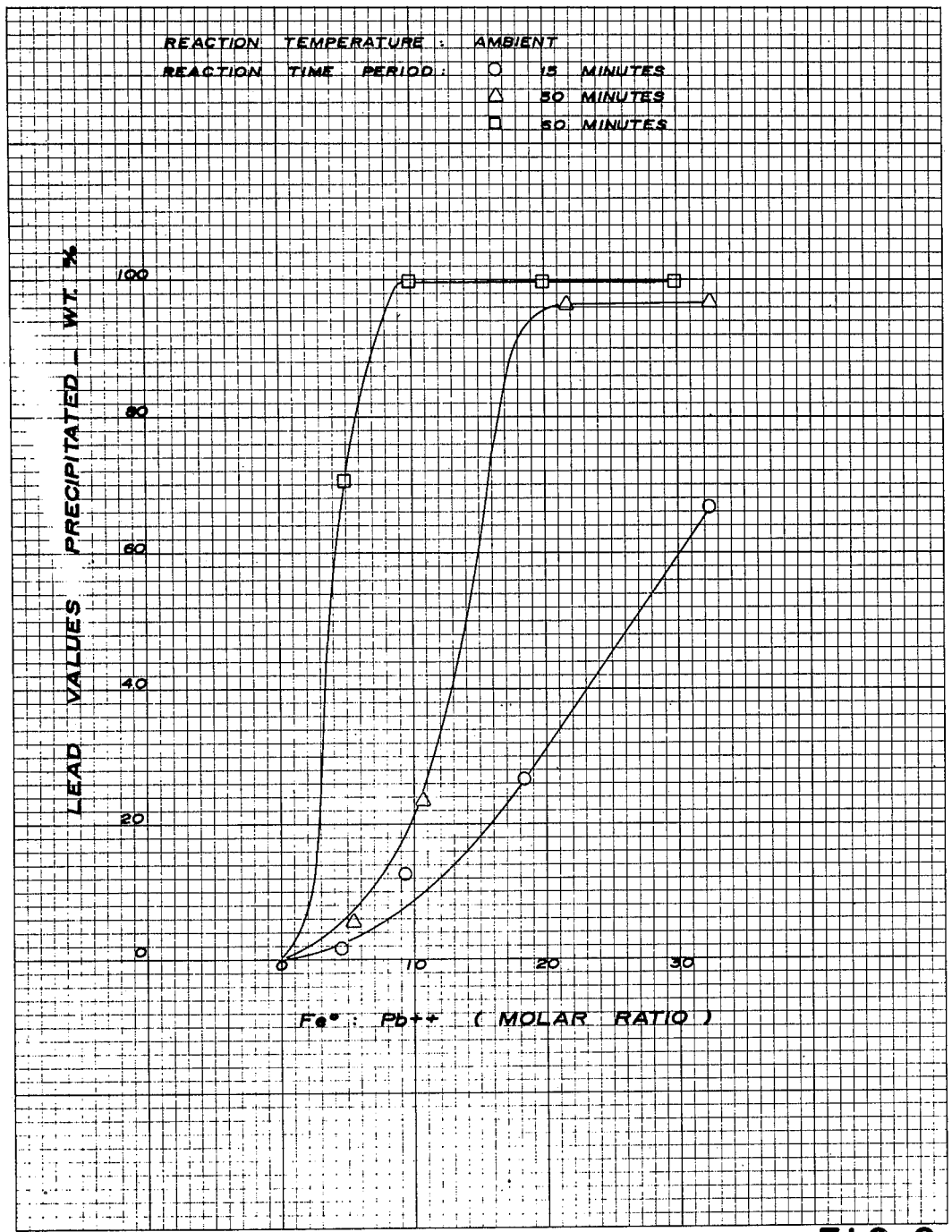
FIG. 9 illustrates the functional dependence of the course of precipitation of lead from a solution containing the same, as a function of reaction time and $Fe°/Pb^{++}$ molar ratio using an $Fe°$ powder precipitant.

The amount of precipitant, normally and preferably iron, should be in an equivalents ratio of 10:1-30:1, preferably 10:1-15:1, in the final stage if complete removal of reactive metals is desired, based on equivalents of iron per one equivalent of total recoverable metal ions in solution. As shown in FIG. 9, the preferred molar ratio for a given ion can be readily determined by routine experiments in order to obtain complete recovery within a desired time period. Advantage may be taken of any significant differences in such molar ratio-time functions for different metal values so that selective and/or sequential precipitation of the individual metal values may be conventionally effected. The effect of the amounts of iron powder and lead ion on the effective removal of lead for various reaction time periods is shown in FIG. 9.

The iron may be employed in any form, but, of course, those types having maximal surface area are preferred. For example, iron powder of particle sizes of about minus 325 mesh (43 μm) are used. The manner of iron addition is not critical but slow, continuous addition over the entire reaction time period or stirring of the precipitation reaction if a bulk addition is made, is, of course, preferred. In general, the precipitation details and technology are fully conventional. Generally, temperatures are from 20° C. up to nearly the atmospheric boiling point of the solution, preferably existing circuit operating temperature since neither heating or cooling is required; pressures are generally ambient; and precipitation times are often 1-6 hours, preferably 1-2 hours. The precipitation conditions, especially the molar ratio of iron to recovered metal and reaction time, are to be selected to ensure essentially complete recovery of at least the lead values and preferably of all minor metals, e.g., Ag, Cu, Cd, As, Sb, etc., i.e., those contained metals which are more noble than the precipitant, e.g., Fe. Practically achieved recovery percentages for these metals are usually 99-100% by weight.

For precipitation of metal ions such as lead from solution by a less noble metal, simple replacement occurs as represented by the following equation:

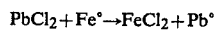

$$PbCl_2 + Fe° \rightarrow FeCl_2 + Pb°$$

Not all metals recovered in this reaction series are precipitated by simple replacement, but subsequent metal purification for each of the products can conventionally provide for their separation, if required. Also, as mentioned, by controlling the molar ratio of the precipitant, usually metallic iron, to the precipitating ion species, it is possible to remove the greater portion of, e.g., those metals listed in EXAMPLE 1 as separate products from most of the lead when desirable, e.g., if it provides for easier or more economic metals purification operations.

Generally, removal of lead from the entire pregnant liquor stream is desirable since lead chloride has a limited solubility even though it is enhanced at high chloride ion concentrations. For the particular illustration of EXAMPLE 1, this is not the case and a portion of the pregnant liquor could be bypassed directly to the zinc cell anolyte. Although this option is not shown in the figure, the lead concentration in the liquor could be elevated by this technique, concurrently with other minor metals, by a factor of perhaps five or more before solubility limitations would be imposed.

The reaction slurry from this precipitation step is separated into a liquor stream and a product solids stream by introduction into a conventional separation device such as a thickener. The solid product of this reaction step may be washed, for example, on a filter equipped for such operation.

Purification of the metal products obtained in this portion of the metals recovery stage is beyond the scope of the process described herein, but is fully conventional and well within the capabilities of known, demonstrated and widely used metals purification process technology. (See, e.g., discussions for each metal in Kirk-Othmer "Encyclopedia of Chemical Technology"; Second revised edition, Volumes 1-22 and supplements. Published by Interscience Publishers, a division of John Wiley and Sons, Inc., whose disclosure is incorporated by reference herein.)

The essentially lead-free and other secondary metals-free liquor stream obtained as a product of the precipitation reaction step is partitioned into two streams. One stream is sent directly to the zinc cell anolyte compartment for solution regeneration. The regenerated FeCl₃ solution is recycled to the metal solubilization stage forming the primary process loop described herein. The balance of the essentially lead-free liquor exits the primary process loop and serves as the feed liquor for the iron precipitation metal recovery stage.

The relative quantities of lead-free solution introduced into each of the two streams mentioned above is primarily determined by the zinc:iron ratio to be maintained in the circuit, and this in turn is based on the zinc and iron quantities introduced into the primary process loop as discussed above. This is, for example, the ratio of the GPM of lead-free liquor sent to the iron precipitation stage to the GPM thereof sent to the zinc anolyte compartment is approximately the same as the weight ratio of ferrous chloride to zinc chloride in the pregnant liquor exiting the solubilization stage. The molar ratio of $FeCl_2/ZnCl_2$ may also serve the same purpose. For example, often 5-50 vol % of the stream leaving the minor metal precipitation stage is fed to the cell anolyte and the remainder to the iron precipitation stage. The determination of the overall flow rate used in the primary process loop is fully conventional using ordinary engineering considerations such as desired product output/day; desired stage volumes; ore metal contents; etc. (See, for example, Hougen and Watson "Industrial Chemical Calculations", Second Edition, p. 242,243—John Wiley and Sons.)

When the temperature of the precipitation slurry is to be lowered (e.g., in those instances when the preceding leach is conducted at super atmospheric pressure due to elevated temperatures, or when the process stream must be cooled to permit utilization in a subsequent step such as a tankhouse circuit wherein a lower operating temperature must be maintained), the feed solution and/or reacting slurry may be cooled by evaporation of a portion of the water contained therein or by using a cooling tower to cool a refrigerating stream of coolant, such as water. In any event, that portion of the solution exiting this precipitation step which is advanced directly to the zinc cell anolyte system should be cooled, when necessary, to within 5°-10° C. of the temperature of the zinc anolyte compartment which is defined below.

B. Iron Precipitation

Iron, the active ingredient in the primary process loop liquors, must be removed prior to utilization of the feed in the zinc electrodeposition cell catholyte compartment. To achieve this, the above-discussed portion of the lead-free liquor exiting the lead and minor metals precipitation stage is passed into the iron precipitation stage. Therein, metallic zinc, e.g., as a dust, is added to the iron precipitation reactor, wherein it reacts with the lead-free liquor to precipitate metallic iron.

The above discussion of the suitable process conditions for the lead and minor metals precipitation stage applies fully to this iron precipitation stage except for the readily apparent and fully conventional differences in details due to the differences in iron and zinc as precipitants and iron and lead as precipitates except as follows. For complete removal of iron from solution, the amount of precipitant, in this case zinc metal, may be present in a molar ration of 4:1, a much lower ratio than required for lead and minor metals precipitation. As an example, see FIG. 10 (the iron precipitate counterpart of FIG. 9) wherein the precipitation of iron values from the process solution using zinc metal powder as a precipitant and a 60 minute reaction time at atmospheric boiling is shown. In a preferred mode, the iron precipitation step is conducted at atmospheric boiling using, e.g., three counterflow reactors under fully conventional conditions.

The iron precipitation reaction using metallic zinc as the precipitant is also a simple replacement by a less noble metal and is represented by the following equation:

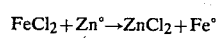
$$FeCl_2 + Zn° \rightarrow ZnCl_2 + Fe°$$

The reaction slurry from this step can be introduced into any conventional suitable separation device such as a thickener and allowed to settle into two phases which are separated from each other. The metal powder formed may be cleansed of adhering process liquor, for instance, by using a filter equipped for washing with a stream of water prior to leaving the circuit. The water washings may be recycled to the process liquor flow to the catholyte. The liquor stream, now containing essentially only zinc chloride along with chlorides of unremoved metals, such as sodium, potassium, calcium and/or magnesium, for example, may be filtered to remove any particulate matter prior to being advanced to the zinc catholyte system.

In those cases where the metallic iron produced in this step is neither recycled to the process nor intended to be a salable product, it may be discarded as a washed filter cake. More often, the powder can be processed in a conventional stabilizing furnace. At least a portion of the stabilized iron powder thus produced can be introduced to the lead and minor metals precipitation step, any balance being a co-product of the process. (Freshly precipitated metal powders possess a much higher than normal surface reactivity. These particles therefore are rapidly oxidized and unsuitable as product. Reduction of this activity is achieved by annealing the surface using elevated temperatures and reducing atmospheres. Simultaneously, metal is regenerated from any oxides formed. Reducing gases may include hydrogen and carbon monoxide, and operating temperatures are generally about 1900° F. The product of such treatment is stabilized iron herein referred to, and equipment wherein such treatment is afforded is a stabilizing furnace.

C. Zinc Electrodeposition Stage

Primary metal recovery for the circuit of EXAMPLE 1 occurs at the cathode of a diaphragm-equipped, electrolytic cell wherein zinc metal is electrodeposited. The zinc metal produced in this step can be used, after suitable pretreatment where necessary, for deposition of metallic iron in the iron precipitation stage.

Zinc metal can be electrodeposited from chloride containing solutions in a variety of physical forms including plates, sheets, dendrites, powders or foils. Selection of the specific type of deposition desired for a given application will depend somewhat on economics. For example, plate and sheet depositions generally are accomplished at somewhat lower current density levels and require lower cell operating voltages compared to those needed for dendrites, powders or foils. For many applications, the foil type product may be considered the best due to its lower capital costs compared to those of the plate and sheet forms, and to the attendant easier metal retrieval and handling compared to those for the dendritic and powder forms.

Electrolysis cells may be readily constructed by a skilled worker for the process of this invention by consideration of conventional factors, for example, with respect to other chlorine-release electrolysis. Generally, cathode and anode areas are 1–3 m$^2$; ZnCl$_2$ catholyte concentrations are 0.5–3.0 M; ZnCl$_2$ and FeCl$_2$ anolyte concentrations are 0.2–2.0 M, and 0.2–1.5 M, respectively; current densities are 100–1700 A/m$^2$, preferably 800–1200 A/m$^2$; cathode current efficiencies are 95–100%; Zn° deposition rates from the catholyte are 16–25 g/min/m$^2$; anolyte temperatures are 30°–60° C., preferably 40°–50° C.; catholyte temperatures are 30°–60° C., preferably 40°–50° C.; pressure is ambient; and electrolysis durations are 0.2–1.0 hours, depending heavily on the desired zinc production rate and the overall process circuit flow rate. Generally, 20–50 wt % of the zinc entering the catholyte as ZnCl$_2$ is removed as Zn° metal, but any desired percentage can be effected by suitable conventional adjustment of electrolysis parameters. Generally, the ZnCl$_2$ concentration should be kept above 6.25% by weight, preferably 10–12% by weight, to ensure deposition of oxidation-free zinc metal product. In contradistinction to the iron removal sequence, complete removal of zinc values from this stream is not necessary because a nearly depleted catholyte would be returned anyway to the primary process loop.

For example, for the continuous production of electrolytic zinc foil, a cell having a continuously rotating circular shaped cathode made of titanium metal plate has been developed. Somewhat similar cells are used to overcome depositional problems associated with production of cadmium metal. (See, e.g.,: "Electrochemical Engineering", by C. L. Mantell, McGraw-Hill Book Company, Fourth Edition, pages 224–231.) In a bench-scale unit, a one-tenth square meter active depositional area was available on each side of the rotary cathode for a total of one-fifth square meter. This necessitated using a 30 inch diameter disc with approximately 33% submergence. In this test unit, cathode rotational speed could be varied over wide ranges, e.g., 15 minutes–1 hour per revolution (depending on current density) to investigate depositional response, foil removal and product characteristics at current densities between 500 and 2500 amps per square meter. Knife edges applied to each side of the cathode provided for continuous removal of deposited metal foil as the rotating cathode passed between them. This continuous removal greatly facilitates the reaction. Catholyte circulation was maintained at volume rates considerably above those for catholyte feed liquor injection, with feed being introduced into the circulating stream at a rate sufficient to control zinc concentration above the minimum value required for deposition of oxidation free foil, generally about three percent by weight for the system used.

Suitable cell anodes include those generally employed in other chlorine-releasing electrolyses, e.g., graphite electrodes. Titanium anodes provided by Imperial Metal Industries (Kynoch) Ltd., Titanium Division, e.g., their dimensionally stable anodes with K-type coatings, are particularly useful.

The catholyte and anolyte sections of the electrolytic cell are maintained physically separated by incorporation of a conventional diaphragm between the two systems as is employed in other chlorine-releasing electrolyses. Such a diaphragm conventionally incorporates a number of desirable characteristics, among these being a high resistance to hydraulic flow, very low electrical resistance and chemical inertness to the chemical and electrical environment to which it is subjected. A number of materials have been tested and found to possess, in varying degree, all of these desirable characteristics, among which are included, e.g., ion exchange membrane materials and Teflon ® membrane material, including Nafion ® manufactured by E. I. Dupont de Nemours and Co.

The zinc metal thus formed is generally washed free of any small quantities of adhering process liquor, which is subsequently recycled to the process flow. The washed metal can be melted in a suitable furnace with that portion used as product being cast in appropriate shapes for sale. That quantity of zinc metal consumed internally within the process, for example, in the iron metal precipitation step, is formed into, e.g., dust-sized particulates by spraying a stream of molten zinc metal into a fast flowing chilling inert gas stream, separating the dust therefrom, and storing the thus separated metal for subsequent use. These procedures are all fully conventional. See, e.g., Kirk-Othmer, "Encyclopedia of Chemical Technology", Second Edition, Volume 22, p. 589, whose disclosure is incorporated by reference herein.

3. SOLUTION REGENERATION STAGE

Simultaneous with the deposition of metallic zinc from the zinc catholyte compartment, the solution regeneration stage is ongoing in the zinc anolyte compartment of the zinc electrolysis stage. Therein, the lead-free liquor containing ZnCl$_2$ and FeCl$_2$ is anodically oxidized to produce a solution of ZnCl$_2$ and regenerated FeCl$_3$. The feed to the zinc anolyte compartment is made up at least of the lead-free liquor exiting the lead and minor metals precipitation stage, but can also include liquor streams which exit subsequently described additional purification stage reactors. In this step, the ferric ion formed is the electro-equivalent of the metallic zinc deposited at the cathode; thus, the oxidation-reduction reactions of the circuit are completed and the regenerated leach solution is recycled to the metal solubilization stage for additional ore leaching.

The details of the solution regeneration stage, of course, have been fully described above under the heading of the zinc electrodeposition stage, since the same electrolysis reaction is involved. In the anolyte compartment, generally, 60–90 molar percent of the ferrous chloride entering is oxidized to ferric chloride.

4. SOLUTION PURIFICATION STAGE

The basic process comprises the foregoing steps. However, there are several optional treatments which can be incorporated, e.g., to cleanse the circulating liquor stream of soluble ions whose buildup could detrimentally affect process efficiency.

A particularly useful optional stage is employed to remove sulfate ion formed in the metal solubilization stage. Such a stage is conventional, e.g., one is disclosed in U.S. Pat. No. 3,785,944, i.e., a method of coprecipitating iron and sulfate ions essentially as the compound jarosite. The disclosure of this patent is incorporated by reference herein for details on this option. This coprecipitation is effected by utilizing oxygen or an oxygen containing gas to oxidize iron from the ferrous state to the ferric state, which, when precipitated from a solution additionally containing sulfate ions, forms a basic iron sulfate such as jarosite, $KFe_3(SO_4)_2(OH)_6$.

Inclusion of this step in the process, e.g., would simply involve withdrawing a small portion of the lead-free liquor from the flow just prior to its entry into the zinc anolyte compartment. The amount of liquor withdrawn would be proportional to the sulfate ion concentration and would be sufficient to reduce the sulfate ion concentration in the main stream to the desired low level after precipitation of jarosite therefrom and return of this sulfate-free liquor to the main stream. The withdrawn liquor is fed to a suitable oxidation reactor such as an autoclave, exposing the liquor therein to oxygen or an oxygen-containing gas such as air. The slurry thus formed is discharged. The slurried solid is separated from the liquor portion by a suitable solids-liquor separations device, and is discarded or otherwise used. The sulfate free liquor portion is reintroduced to the circulating process loop for entry into the zinc anolyte compartment.

The details of the sulfate removal stage (e.g., amounts of $O_2$, temperatures, pressures, flow rates, etc.) may be selected by routine experiments and/or conventional considerations with reference to the above-mentioned disclosure in U.S. Pat. No. 3,785,944. Generally, an oxygen overpressure in the range 10-40 pounds per squire inch and operating temperatures from 80°-120° C. provide for oxidation from ferrous to ferric ion with attendant removal from solution of approximately one-third of the iron. When such precipitation takes place from a solution containing additionally sulfate ions, a basic iron sulfate such as jarosite forms. The amount of process liquor to be so treated is determined primarily by sulfation level (i.e.: oxidation $S^{--}$ to $SO_4^{--}$) and is generally from 10-30% of the amount circulated.

In those cases where cations such as sodium, calcium, magnesium and potassium tend to build up in the circulating process liquor stream and cannot be removed by cementation or electrodeposition as for metallic cations, it may be necessary to incorporate a solution purification step therefor. For example, a small portion of catholyte leaving the catholyte compartment of the zinc electro-deposition cells may be withdrawn for carbonate precipitation in a carbonate reactor. The valuable zinc component in the withdrawn solution is preferentially precipitated using, for example, sodium carbonate or a solution thereof under conditions such that $MgCO_3$ and $CaCO_3$ remain essentially totally solubilized. Such conditions are discussed below with reference to FIG. 11 and the high carbonate ore option.

The amount of process liquor withdrawn will be proportional to the concentrations of the ionic impurities in the stream and the acceptable level to which the concentrations are to be lowered. In general, 97-100% (FIG. 11) of the zinc in the withdrawn liquor can be removed as $ZnCO_3$ and subsequently returned as zinc ion to the main liquor flow. The carbonation reaction is generally run at circuit temperature of 40°-50° C. for a time and using amounts of carbonate reactant sufficient to effectively and selectively precipitate $ZnCO_3$. In general, suitable conditions include those discussed below with regard to the high carbonate ore modification.

The zinc carbonate thus formed has been found to be easily handlable operationally, settles well and is rapidly filterable. The liquor from the separation step is discarded. It contains the undesirable cations which remain in solution since the precipitation conditions (time and amount of carbonate added, etc.) are selected to preferentially precipitate essentially only the zinc ions. The washed zinc carbonate cake is conventionally dissolved in hydrochloric acid containing liquor (13-18% Cl volume sufficient to provide two equivalents of HCl) and reintroduced into the main process loop. The hydrochloric acid liquod for the $ZnCO_3$ reaction may be formed, e.g., by mixing gaseous HCl with untreated catholyte emanating from the catholyte compartment. The $HCl/ZnCO_3$ reaction is fully conventional and conditions may be selected accordingly.

FIG. 1 also shows a water removal loop for use whenever excess water builds up in the system due to the various reactions ongoing. This water removal may be very conventionally effected using any well known water removal technique such as evaporation. For example, the water content may be adjusted whenever the concentration of $FeCl_3$ in the regenerated solution recycled to the leach step would otherwise be too low.

Deliberate water addition to any closed-loop chemical processing circuit is generally limited to necessary product and waste solids washing to reduce loss of valuable process liquors. The circuit has certain inherent capabilities for removal of water such as evaporative cooling to dissipate circuit heat (i.e., high temperature leach liquor cooling and heat removal from tankhouse liquors). Should necessary and required water additions exceed inherent circuit capabilities for removal thereof, additional removal capacity as for example single or multiple effect evaporators would be required to prevent accumulation and attendant discard of surplus fluid volume generated as well as chemical additions to maintain liquor composition at required levels.

5. HIGH CARBONATE ORES

The preferred version of the process of the invention to be employed in conjunction with high carbonate zinc and/or lead ores (e.g., ores containing $\neq 5-\neq 40$ wt.% of carbonates such as $MgCO_3$, $CaCO_3$, etc.) is described below. Since the basic process of this invention as described above is in essence directly applicable, all details of the general process are the same as described above unless otherwise indicated below where the preferred modifications desired because of the carbonate content of the feedstock are discussed.

Figure 12:
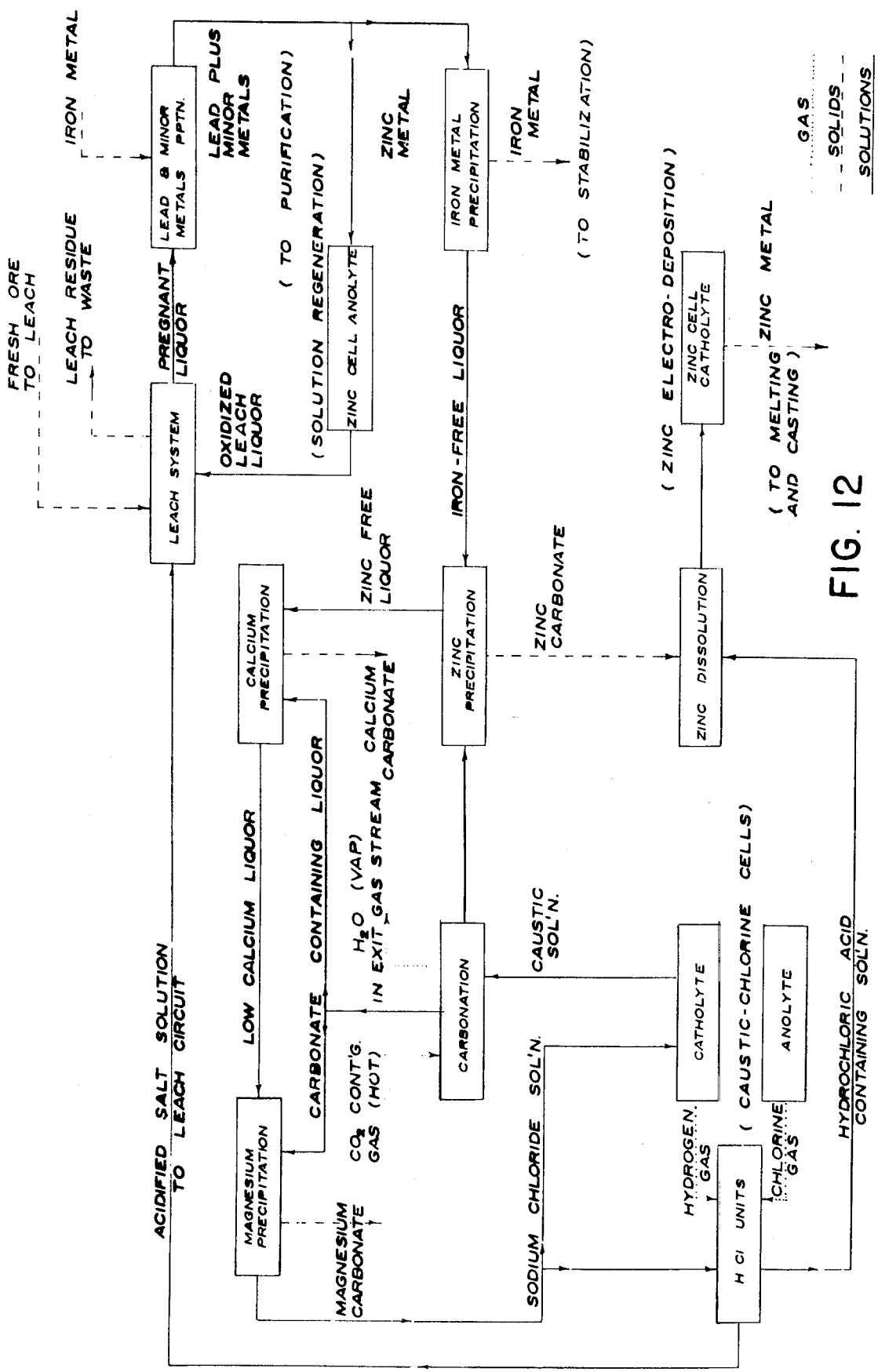
FIG. 12 demonstrates the application of the basic process of this invention to the removal of lead and zinc values from an ore thereof which additionally contains relatively large amounts of carbonate minerals.

Generally, these modifications involve the use of a multi-step solubilization stage and the incorporation of a carbonation stage prior to the zinc electrolysis stage, preferably along with a caustic chlorine circuit for production of NaOH used to generate the carbonate for the carbonation stage. The overall schematic for a preferred process is shown in FIG. 12.

A. Metal Solubilization Stage

Figure 14:
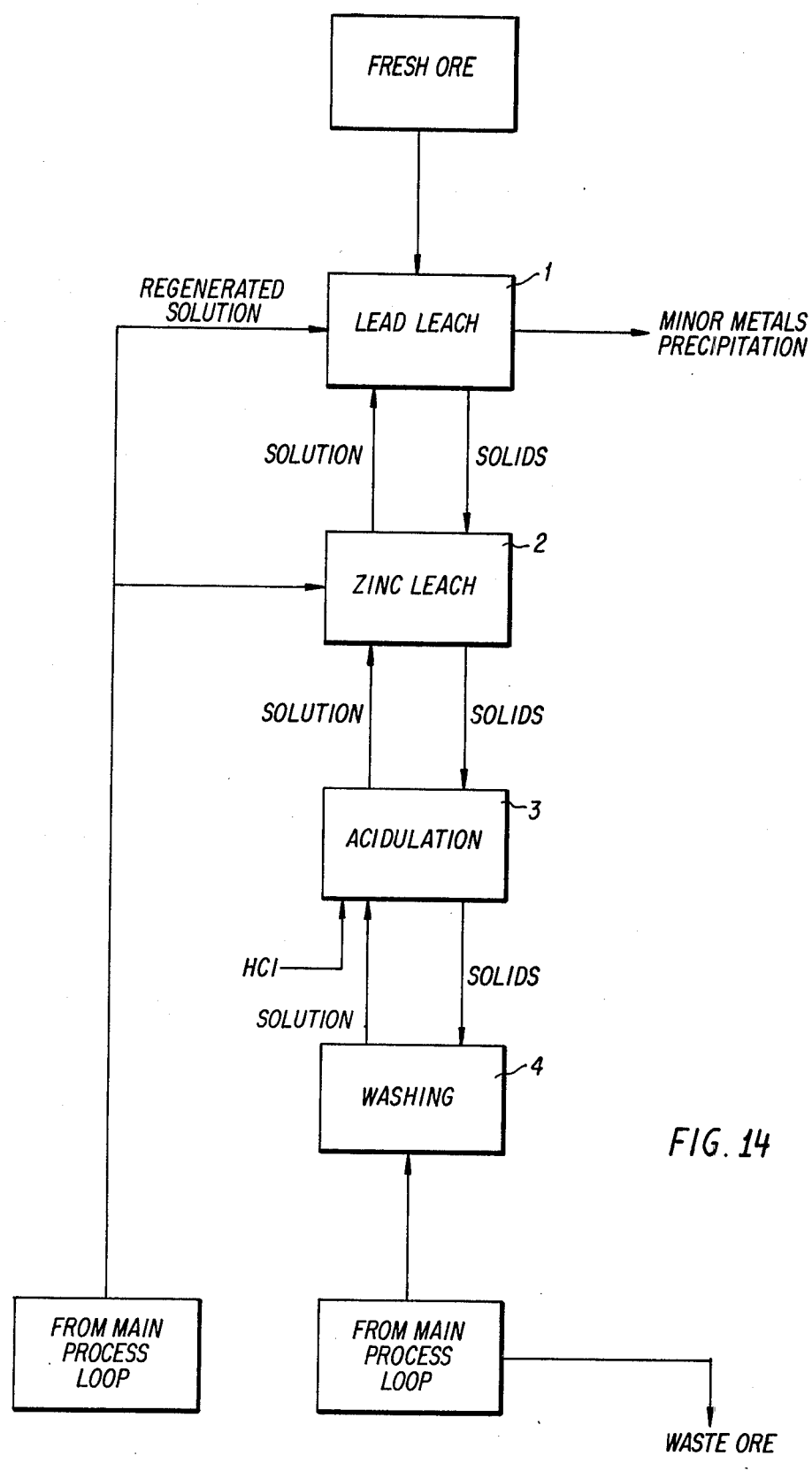
FIG. 14 schematically illustrates a preferred multistep solubilization stage for use in applying a process of this invention to a high-carbonate zinc/lead ore.

As mentioned, one of the major modifications of the basic process due to the presence of the high carbonate content involves the use of a multi-step solubilization stage. The details of this stage can be routinely determined by conventional experimentation depending upon the solubilization properties of the particular ore of interest. However, as explained below, an additional acidulation step, following the leaching step or steps, is required due to the formation of insoluble hydrated ferric oxide salts. A typical solubilization schematic is shown in FIG. 14. Therein, the solubilization stage is in essence a four-step stage, a first leaching stage, a second leaching stage, an acidulation stage and a washing stage.

Figure 13:
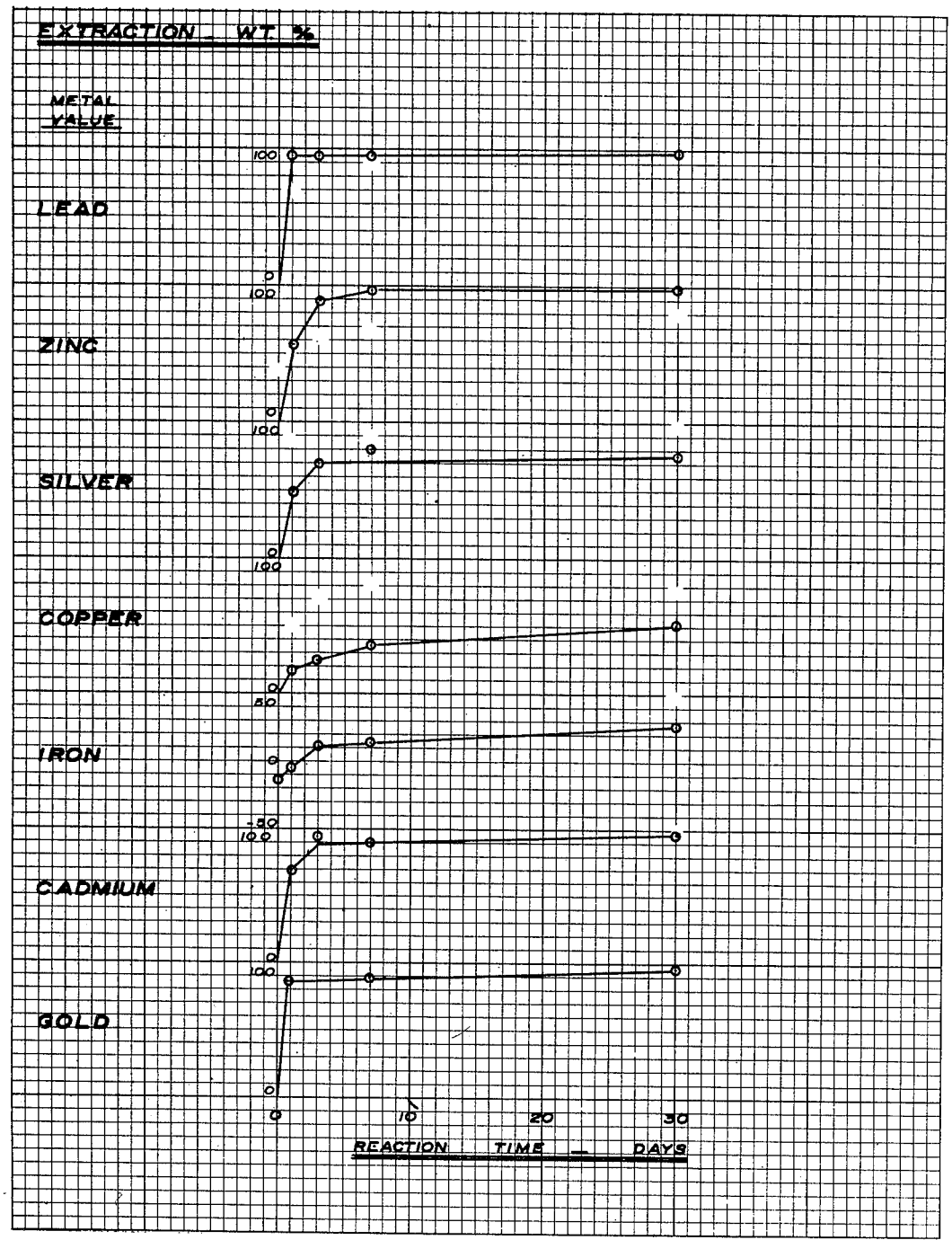
FIG. 13 illustrates the leaching rate of metal values from a high carbonate ore using the leach solution of this invention (ambient conditions; particle size: minus 100 mesh)

The need and/or desirability for two leaching stages can be seen, for example, by inspection of FIGS. 2 and 13 which display leach rate data for essentially minus 100 mesh and minus 8 mesh particle size high carbonate content ore material which has been exposed to a typical process solution of this invention under conditions of ambient temperature. These data demonstrate the relatively fast dissolution rate for lead compared with zinc and/or other metals. Consequently, such a system is quite suitable for a two-step process wherein the conditions for each step are routinely selected to be most favorable to the leaching of the fastest solubilized metal in the first stage and the slower solubilized metals in the second stage. Similarly, other details for each of the leaching steps within the solubilization stage may be chosen in order to adapt the particular conditions to the characteristics of the given ore. For example, for the particular ore of FIGS. 2 and 13 (i.e., the same ore described below with reference to EXAMPLE 3), for minus 100 mesh particles, the data demonstrate that the dissolution of zinc, particularly, is much too slow to permit the use of stirred tank reactors for high tonnage production. Accordingly, vat, heap or dump-type reactors would be preferred. In addition, vat-type installations are more attractive for this application since the leaching reaction suite for carbonate-containing materials involves an acidulation stage. As a result, this stage must be isolated from fresh unreacted ore and should be conducted in the presence of excess ferric chloride solution in order to prevent formation and release of hydrogen sulfide, a poisonous gas. Accordingly, in general, the metal solubilization stage of FIG. 12 will consist of at least four separate vats, one for each step, or, in general, more than one such vat for each step, as described in EXAMPLE 3 which contains complete details of a typical application of the process of this invention to a high carbonate ore.

Study of the details of the metal solubilizations depicted in FIG. 2 is particularly revealing of the nature of the various sequential reactions which occur. The larger particle sizes employed in this solubilization result in slower reactions to the point where it is possible to separate their effects individually. For example, the rapid and complete solubilization of lead values in comparison with that of zinc (corresponding to stage 1 discussed below) is observable. Moreover, precipitation of iron by reaction with ankerite and the accompanying dissolution of calcium and magnesium values are equally discernible. As soon as the ankerite destruction is completed, the primary reaction in the leaching solution is sulfation resulting in resolubilization of a portion of the previously precipitated iron values and simultaneous precipitation of calcium as gypsum which, as mentioned below, is advantageous as an inherent sulfate-removal mechanism.

Upon further consideration of the details of FIGS. 2 and 13, particularly the relatively rapid solubility rate for galena (lead sulfide) in combination with the low solution concentration tolerance for lead, a relatively large circulation rate for the process liquor from vat to vat within the first step is highly advantageous, i.e., on the order of 100–300 gallons/minute for each ton/day lead solubilized in the first step in comparison with a rate for the second step which is generally 10–30 times slower, the absolute value of these rates, of course, depending upon the particular details for a given process. As mentioned, these details are within the general ranges mentioned above and can be selected by routine considerations.

After the ore has been subjected to the leaching treatment via the regenerated ferric chloride solution and the partially spent solution emanating from step 2, the combination of which forms the treating solution for step 1, the remaining solids are led to the reactor(s) of step 2 wherein zinc is predominantly leached, but also dissolution of the lead content is completed. As mentioned, in this step, generally smaller liquor flow rates are utilized. Moreover, while in general, the $FeCl_3$ concentration in the first step is 0.05–0.15 M, in the second step a 0.15–0.35 M solution is generally used. As can be seen from inspection of FIG. 14 and EXAMPLE 3, the leaching liquid in this second step is the spent acidulation liquor emanating from the acidulation step. After treatment in this second step, the remaining solids are led to the acidulation stage.

The acidulation liquor which exits this third step of the process (acidulation step) has a relatively high concentration of ferric iron due to resolubilization of the iron solids formed in leaching steps 1 and 2.

The need for this step may be seen by analysis of the underlying chemical reactions ongoing in the solubilization stage. In step 1, the carbonate mineral reacts with ferric chloride as follows:

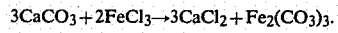
$$3CaCO_3 + 2FeCl_3 \rightarrow 3CaCl_2 + Fe_2(CO_3)_3.$$

Being unstable, the iron carbonate solid decomposes slowly, yielding a hydrated ferric oxide and carbon dioxide:

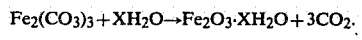
$$Fe_2(CO_3)_3 + XH_2O \rightarrow Fe_2O_3 \cdot XH_2O + 3CO_2.$$

Thereafter, in the third step of the solubilization, the hydrated ferric oxide along with ay undecomposed ferric carbonate and carbonate minerals reacts with hydrochloric acid as follows:

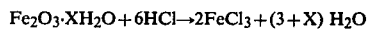
$$Fe_2O_3 \cdot XH_2O + 6HCl \rightarrow 2FeCl_3 + (3+X) H_2O$$

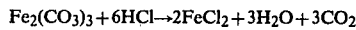
$$Fe_2(CO_3)_3 + 6HCl \rightarrow 2FeCl_2 + 3H_2O + 3CO_2$$

$$CaCO_3 + 2HCl \rightarrow CaCl_2 + H_2O + CO_2.$$

Of course, the metal suflide reactions discussed above are concurrently proceeding during the entire solubilization stage.

This resolubilizing acidulation step may be implemented in practice, e.g., as shown in FIG. 14 and EXAMPLE 3, by admixing a portion of the recycling regenerated solution, most of which recycles to the first leaching step (e.g., generally, 80–95 weight percent of the recycling regenerated solution would be used as the treating liquid in step 1), and hydrogen chloride. The latter is preferably derived from a reaction of hydrogen and chlorine in the preferred caustic chlorine unit discussed hereinafter.

In general, the pH of the acidulation stage is 0.1–1.0; the amount of acid employed is 0.9–1.1 times the equivalent amount required to solubilize all hydrated iron oxide solids, depending on sulfation level, e.g., 70–80 gallons of 9–11 M HCl per ton or ore having a typical Zn/Pb content as mentioned above; the acidulation treatment is generally conducted for 5-10 days at a temperature of 10°-25° C. (i.e., ambient conditions).

The solids emanating from the acidulation stage can optionally be washed in the fourth step, the washings being added as part of the treating liquor in the acidulation stage and the washed solids forming the waste output of the solubilization stage. The washing liquid can be any suitable aqueous solution, e.g., the various low metal content solutions emanating from the various metal precipitation stages as shown in FIG. 16 for example. Conditions of the washing step are readily determinable by fully conventional considerations.

EXAMPLE 3 contains details of the entire process for recovering metal values from a high carbonate content ore.

Material selected as feedstock for this example is an as-mined zinc mineralized section containing additionally lead, copper and silver values. Compositionally, the material contains 29 percent by weight carbonate gangue minerals, 38 percent silicate minerals and 33 percent metal sulfides. The carbonate portion of the feed material was essentially the mineral ankerite (Ca, Fe, Mg, Mn)$CO_3$ with nominal grain size $\neq 5$ μm. Silicate minerals present included quartz ($SiO_2$) and potassium aluminum silicates. Primary distributions of metal values of interest are shown in the Table below.

TABLE 4

| Element | Metal Residence |
|---------|-----------------|
| Zinc | Marmatitic Sphalerite |
| Lead | Galena |
| Copper | Small amount in Chalcopyrite, mostly in sphalerite as submicroscopic chalcopyrite Blebs or as a metastable solid solution. |
| Silver | Probably as submicroscopic inclusions of Ag-sulfides in Sphalerite |
| Iron | Pyrite, Chalcopyrite or as solid solution in Ankerite and Sphalerite |

In EXAMPLE 3, the fresh ore is in vat 1 of the first solubilization stage which comprises vats 1-4. The second solubilization step comprises vats 5-9; while vats 10 and 11 comprise the third and fourth steps respectively, acidulation and washing. The details of this EXAMPLE, of course, are derived primarily by the specific characteristics of the particular ore utilized. Any changes necessary due to the use of an ore having significantly different characteristics can be determined by routine experimentation by one of ordinary skill in the art.

A particularly beneficial advantage of this version of the process of this invention due to the presence of high amounts of carbonate is that the resultant large amounts of calcium ion which are solubilized in the leach system form calcium sulfate which precipitates from the solubilization stage. Consequently, the need for an additional sulfate-removal step is minimized. Additionally, this precipitation occurs at that stage of the process which is most ideal, i.e., that wherein the build-up of sulfate ion is maximized, i.e., during the solubilization stage, and wherein large depositional areas are available, e.g., the surfaces of ore particles in the leaching reactor.

B. Zinc Removal Step

The second major modification of the basic process of this invention due to the high carbonate content involves the steps utilized in zinc removal from the solution emanating from the iron metal precipitation stage. This iron-free liquor differs from that of the basic process in that a relatively large calcium and magnesium iron concentration is present. Accordingly, this liquor is not fed directly into the zinc cell catholyte. Rather, the zinc is selectively removed therefrom and then resolubilized and fed into the catholyte cell. This selective zinc removal is also utilized in order to eliminate zinc precipitation during the subsequent precipitation of calcium and magnesium carbonates. Accordingly, the iron-free liquor emanating from the iron precipitation stage is first led into a zinc precipitation step.

The principles of the selective zinc precipitation are essentially the same as those which enable the solution purification with respect to, e.g., calcium and magnesium as discussed in the foregoing section on solution purification. This step involves addition of carbonate to the cation-containing solution. In accordance with FIG. 11, the more insoluble zinc carbonate selectively precipitates with respect to the less insoluble carbonates of calcium and magnesium. In order to achieve this selective precipitation, generally from 1.00-1.05 equivalents of carbonate are added per equivalent of zinc carbonate. In general, the zinc carbonate precipitation step is carried out at a temperature of 60°-100° C. for a period of 0.5-1.5 hours.

The resultant zinc carbonate-containing slurry is separated into its solid and liquid phases using fully conventional equipment such as a thickener followed by filtration for the underflow slurry. The essential zinc-free liquor is subsequently fed to the calcium and magnesium removal steps. The zinc carbonate cake is separately redissolved using hydrochloric acid. The latter is preferably provided from the caustic-chlorine circuit described below by dissolution of the gaseous HCl produced therein into e.g, a circulating zinc catholyte liquor stream whose circulation path includes both the zinc cell catholyte and a zinc carbonate dissolver. As mentioned above, the dissolution of zinc carbonate is, of course, fully conventional. In general, 1.00-1.05 equivalents of HCl per equivalent of zinc carbonate cake are added to the zinc carbonate dissolver in a concentration in the range of approximately 1.0-1.5 M. The temperature of the zinc carbonate dissolution step is generally 40°-50° C. and the dissolution reaction is normally conducted for 15-30 minutes.

In general, 99.5-100.0 percent of the zinc in the iron-free liquor is removed in this fashion. As long as the foregoing conditions are met, the contamination with cations such as calcium and magnesium is negligible. Any impurities such as calcium and magnesium introduced with the zinc carbonate cake into the zinc tankhouse catholyte may be controlled and removed by withdrawing a small bleed stream (1-5% of the circulating load) and returning it to the zinc precipitation reaction.

The basic chemical equations underlying the reactions for this zinc precipitation stage are as follows:

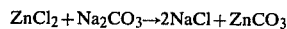

$$ZnCl_2 + Na_2CO_3 \rightarrow 2NaCl + ZnCO_3$$

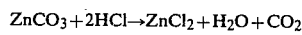

$$ZnCO_3 + 2HCl \rightarrow ZnCl_2 + H_2O + CO_2$$

The zinc chloride formed in the zinc cell catholyte circulating liquor as a result of the zinc carbonate dissolution serves to maintain the zinc concentration in the circuit at any desired value. See EXAMPLE 3 for an illustration.

C. Calcium and Magnesium Removal

Figure 11:
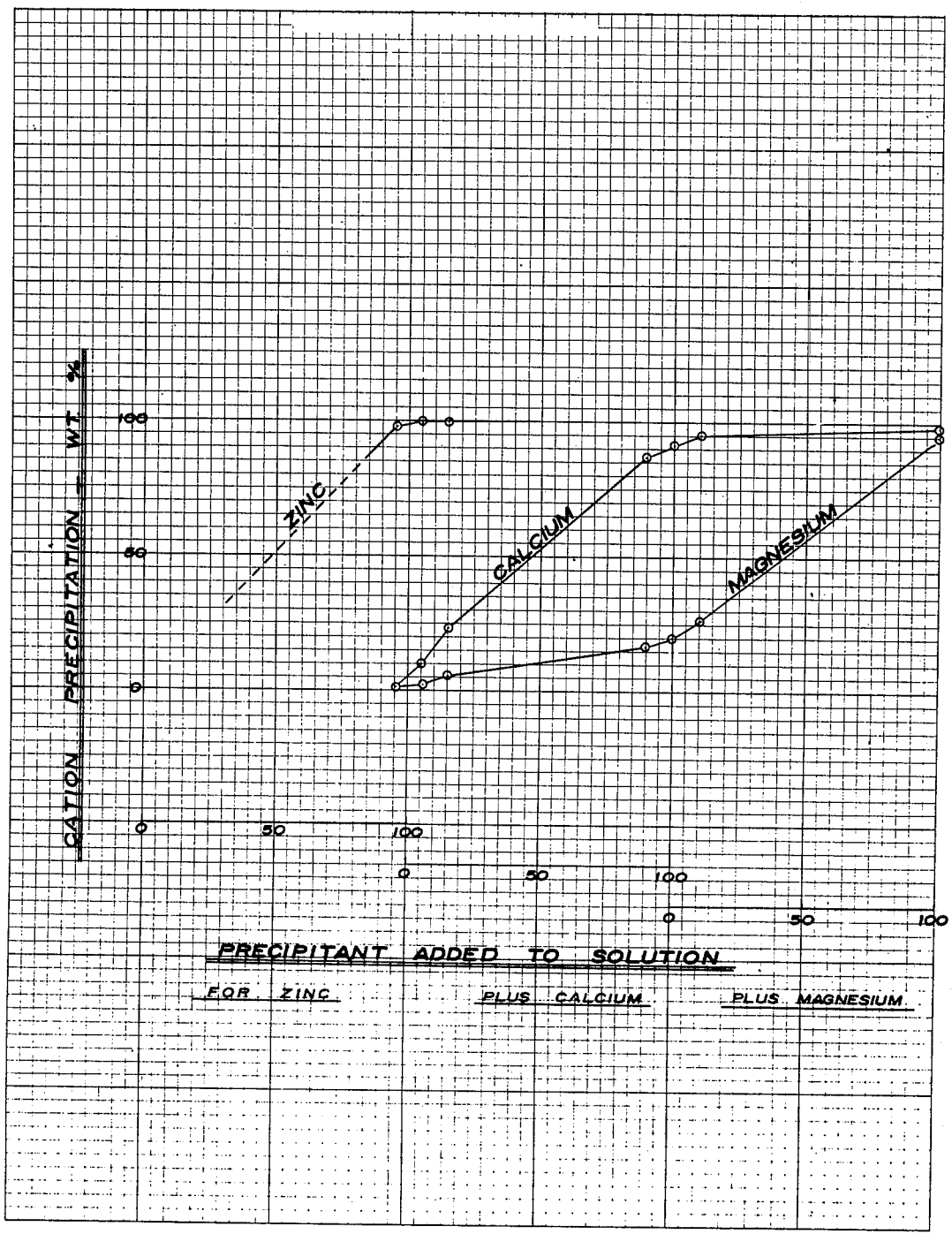
FIG. 11 illustrates the sequential removal of zinc, calcium and magnesium from a solution thereof by sequential carbonate precipitation.

The removal of calcium and magnesium as their carbonates is carried out using the same principles described with respect to the zinc carbonate removal. As shown in FIG. 11, the removal of calcium and magnesium carbonates can be done on a selective basis, if economically and otherwise desirable. That is, referring to FIG. 11, approximately 95% of the calcium can be removed as its carbonate along with about 25% of the contained magnesium values. Better than 90% of the remaining magnesium can subsequently be removed with very little calcium contamination. These reactions are generally conducted at temperatures of 60°–100° C. for times of 0.5–1.5 hours. Generally, the amount of carbonate reactant added to the calcium and magnesium-containing stream is determined by conventional considerations, e.g., see the foregoing discussion with regard to the zinc removal. In general, from 0.95–1.05 equivalents of carbonate reactant, e.g., sodium carbonate, are added per equivalent of total amount of calcium and magnesium cations.

Unless a market exists for one or both of these materials, it is preferred to precipitate the calcium and magnesium values in order to reduce the complexity of the process, e.g., the number of reactors, solids/liquor separation equipment and process controls which are required.

The carbonate reactant for the calcium and magnesium removal steps, as well as for the zinc removal step, is preferably provided from a separate carbonator step wherein e.g., sodium carbonate is manufactured. For example, this carbonator can comprise a reactor wherein carbon dioxide and sodium hydroxide liquor are combined. The sodium hydroxide is preferably provided from the caustic/chlorine circuit described below. In general, from 0.50–0.55 equivalents of $CO_2$ are added per equivalent of sodium hydroxide liquor in the carbonator. The sodium hydroxide liquor is added to the reactor at a concentration of, e.g., 1.5–2.5 M. The temperature and time of reaction for the sodium carbonate production step are fully conventional, e.g., 40°–50° C. for a time of 0.25–0.50 hours. The carbon dioxide reactant can be from any suitable source.

the main process stream emanating from the calcium and magnesium precipitation step contains predominantly sodium (and/or potassium) chloride which is recycled back to the solubilization stage, e.g., the washing step thereof.

For an example of the details of carrying out this phase of the process, EXAMPLE 3.

D. Caustic Chlorine Circuit

As can be seen from the foregoing, in order to adapt the basic process to the treatment of high carbonate-containing ores, it is preferred to incorporate certain acid base reactions, e.g., in the acidulation step of the solubilization stage, as well as in the carbonate precipitation of zinc, calcium and/or magnesium and the redissolution of zinc carbonate. In contradistinction, the reactions of the basic process circuit are oxidation-reduction reactions. In order to maintain the highly desirable closed loop attributes of the overall process, wherein reagents are regenerated and recycled rather than routinely added and discarded, and to provide the necessary acid-base reactions, it is preferred that this adaptation of the main process incorporate a caustic-chlorine circuit. For example, see FIG. 12 and EXAMPLE 3. The details of the operation of such a system are fully conventional and may be determined in accordance with routine considerations involved in designing such conventional electrolytic systems. For example, see Kirk-Othmer "Encyclopedia of Chemical Technology" Second Edition, Vol. 1, pp. 668–757 inclusive. The input stream for the catholyte section of the diaphragm equipped caustic chlorine electrolytic cells is the major portion of the liquor stream exiting the calcium-magnesium removal system, which also can include the liquor exiting the zinc removal system. For example, from 75–90 percent of this final process stream can be used as the catholyte input, the remainder generally being used as input to the solubilization stage, e.g., the washing step thereof. This final process liquor consists primarily of sodium and/or potassium chloride solution. In general, the alkali metal chlorides concentration therein is 3.5–4.5 M which is suitable for the input stream to the electrolytic cells.

For the caustic-chlorine unit, as is routinely determinable by conventional considerations, cathode and anode areas may be 10–30 m$^2$; current densities are 775–1,250 A/m$^2$; cathode current efficiencies are 95–97%; and cell temperatures are 40°–60° C.

At the cathode, electrolytically deposited metallic sodium reacts with water, forming sodium hydroxide in solution and releasing hydrogen gas. The chloride ion originally associated with the sodium chloride is electrochemically transposed through the diaphragm and is oxidized at the anode to elemental chlorine. Thus, the three products needed to form the acidic and basic reactants mentioned above are produced.

For example, the hydrogen gas formed at the cathode and the chlorine gas formed at the anode are separately transported to a hydrogen chloride combustion unit wherein the exothermic combination of hydrogen and chlorine is carried out. The requisite amount of HCl for the acidulation stage is taken from the product stream of the HCl unit and added to the third step of the solubilization stage. This can be carried out by adding the HCl gas to the portion of the liquor remaining after the calcium magnesium removal which was not led to the caustic-chlorine circuit. The gas can be added prior to or after the same liquor is used in the fourth step of the solubilization stage, e.g., the washing step. The balance of the HCl, as needed, is dissolved in the circulating zinc cell catholyte liquor in order to accomplish redissolution of the zinc carbonate cake produced in the zinc removal step.

The sodium hydroxide formed in the caustic chlorine unit is led to a carbonation reactor wherein it is conventionally reacted with $CO_2$ according to the following equation:

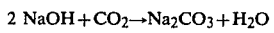

The source of the carbon dioxide for this reaction is not critical. Any convenient source thereof may be used. A preferred source of $CO_2$ is by-product stack gas from fossil fuel consuming reactors such as steam boilers, dryers, calciners or diesel engines. Often, one or more of such sources will be available at a processing facility. Optionally, the hot $CO_2$ gas stream can be humidified by contact with the process liquor, thereby concurrently removing water (by evaporation) therefrom and permitting more wash water addition to the circuit providing opportunity for a more thorough washing of leach residue and carbonate solids prior to discarding thereof.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES

Example 1

Referring to FIG. 1, a lead-zinc containing or concentrate feed stock having the composition shown in the table below is feed into a metal solubilization, or leaching stage at the rate of 211 tons per day (T.P.D.).

| Weight % | | Extn. % | Extd. Lbs. |
|---|---|---|---|
| 49.83 | Zn | 95 | 200,000 |
| 3.21 | Pb | 95 | 12,884 |
| 0.382 | Cu | 75 | 1,211 |
| 0.056 | Ag | 95 | 224 |
| 0.505 | Cd | 95 | 2,027 |
| 0.076 | As | 80 | 258 |
| 0.067 | Sb | 80 | 226 |
| 8.35 | Fe | 85 | 29,986 |

The results of the extraction are also shown in the above table. The pregnant liquor of the composition,

| WEIGHT % | | WT. LBS. |
|---|---|---|
| 69.4 | $H_2O$ | 28,385,334 |
| 28.1 | $ZnCl_2$ | 11,507,942 |
| 2.5 | $FeCl_2$ | 1,007,184 |
| — | $PbCl_2$ | 17,293 |
| — | $CuCl_2$ | 2,562 |
| — | $AgCl_2$ | 298 |
| — | $CdCl_2$ | 3,305 |
| — | $AsCl_3$ | 623 |
| — | $SbCl_3$ | 423 |
| | | 40,924,964 | is fed into the lead and minor metals precipitation stage at the rate of 2840 gallons per minute (GPM). Therein, 6,045 pounds of Fe° powder are fed, thereby producing the following metals:

| METAL | WT. LB. |
|---|---|
| Cu° | 1,211 |
| Pb° | 12,884 |
| Ag° | 224 |
| Cd° | 2,027 |
| As° | 258 |
| Sb° | 226 | and the following lead-free liquor:

| WT. % | | WT. LB. |
|---|---|---|
| 69.4 | $H_2O$ | 28,385,334 |
| 28.1 | $ZnCl_2$ | 11,507,942 |
| 2.5 | $FeCl_2$ | 1,020,903 |
| | | 40,914,179 |

The recovered metals are then sent to conventional purification stages. If desired, Pb° may be precipitated separately. The liquor output from the lead and minor metals precipitation stage (2840 GPM) is separated into two flows, one at 230 GPM and one at 2,610 GPM. The former is fed into the iron precipitation stage wherein 42,173 lbs. of zinc dust are added thereto, as for the iron added to the lead and minor metals precipitation stage, over the period of one day. The product of the iron precipitation stage is 36,031 lbs. of iron metal which is subsequently fed into an iron stabilizing process, and a zinc catholyte feed of the following composition:

| WT % | | WT. LB. |
|---|---|---|
| 69.2 | $H_2O$ | 2,273,581 |
| 30.8 | $ZnCl_2$ | 1,009,665 |
| | | 3,283,246 | which is fed at a rate of 230 GPM into the zinc catholyte.

The larger flow emanating from the lead and minor metals precipitation stage (2,610 GPM) is fed into the zinc anolyte cell. The zinc product from the zinc catholyte is a total of 242,173 lbs. of zinc, 42,173 of which are recycled to the iron precipitation stage. All of the zinc first is sent to a melting unit. The total output from the zinc catholyte cell is:

| WT. % | | WT. LB. |
|---|---|---|
| 81.8 | $H_2O$ | 2,273,581 |
| 18.2 | $ZnCl_2$ | 504,833 |
| | | 2,778,414 |

262,660 lbs. of chloride ion being transferred from the catholyte to the anolyte to maintain electrochemical balance. The rate of output from the catholyte is 190 gallons per minute of spent catholyte and 40 gallons per minute of liquor transferred to the anolyte directly. The combined output from the zinc anolyte and catholyte cells (2840 GPM) has a composition of:

| WT. % | | WT. LBS. |
|---|---|---|
| 69.7 | $H_2O$ | 28,385,334 |
| 27.3 | $ZnCl_2$ | 11,091,023 |
| 3.0 | $FeCl_3$ | 1,201,793 |
| | | 40,678,150 | which serves as the leach liquor feed to the metal solubilization stage. The leach residue which remains after the metal solubilization stage has a composition of:

| | WT. LBS. |
|---|---|
| Zn | 10,526 |
| Pb | 678 |
| Cu | 463 |
| Ag | 12 |
| Cd | 107 |
| As | 64 |
| Sb | 57 |
| Fe | 5,292 |
| S° | 118,771 |

EXAMPLE 2

Again, in reference to FIG. 1, the process of this invention is applied to the retrieval of lead from a zinc-containing ore/ore concentrate material. The total feed concentrate had a weight of 422,489 lbs. and the aim was to achieve 100 tons of zinc in the final concentrate obtained as the leach residue. More precisely, the concentration of the feed concentrate for the ore leaching stage was:

| FEED CONCENTRATE | | | | |
|---|---|---|---|---|
| WT. % | | WT. LB. | EXTN. % | EXTD. LB. |
| 49.83 | Zn | 210,526 | 5.0 | 10,526 |
| 3.21 | Pb | 13,562 | 98.0 | 13,291 |
| 0.382 | Cu | 1,614 | 5.0 | 81 |
| 0.056 | Ag | 267 | 50.0 | 134 |
| 0.628 | Cd | 2,653 | 15.0 | 398 |
| 0.046 | As | 194 | 95.0 | 184 |
| 0.067 | Sb | 283 | 10.0 | 28 |
| 8.35 | Fe | 35,278 | 10.0 | 3,528 |
| | TOTAL | 422,489 | TOTAL | 28,170 |
| 37.42 | BAL. | 158,112 | | |

The result of the extraction for each of the ingredients is also shown in the Table above.

The pregnant liquor emanating from the leach stage at a rate of around 415 GPM had a composition of:

| WT. % | | WT. LB. |
|---|---|---|
| 87.45 | $H_2O$ | 5,223,127 |
| 10.83 | $ZnCl_2$ | 646,876 |
| 0 | $FeCl_3$ | 0 |
| 1.40 | $FeCl_2$ | 83,500 |
| 0.30 | $PbCl$ | 17,839 |
| 0.003 | $CuCl_2$ | 171 |
| 0.003 | $AgCl$ | 178 |
| 0.011 | $CdCl_2$ | 649 |
| 0.008 | $AsCl_3$ | 445 |
| 0.001 | $SbCl_3$ | 52 |
| | | 5,972,834 | while the final concentrate obtained as a leach residue had a composition of:

| WT. % | | WT. LB. |
|---|---|---|
| 50.720 | Zn | 200,000 |
| 0.069 | Pb | 271 |
| 0.389 | Cu | 1,533 |
| 0.034 | Ag | 133 |
| 0.572 | Cd | 2,255 |
| 0.003 | As | 10 |
| 0.065 | Sb | 255 |
| 8.052 | Fe | 31,750 |
| 2.420 | $S°$ | 9,541 |
| 40.097 | BAL. | 158,112 |
| | TOTAL | 394,319 |

(All solution flow rates in this example are for a production of 100 T.P.D. of zinc.)

The pregnant liquor is fed into a two-stage lead and minor metals precipitation. In the first stage, 529 lbs. of iron in total are added in order to precipitate selectively copper and silver. More precisely, the product of this first step of the minor metals precipitation stage is:

| | WT. LB. |
|---|---|
| $Cu°$ | 81 |
| $Ag°$ | 134 |
| $Cd°$ | 398 |
| $As°$ | 184 |
| $Sb°$ | 28 |

The 415 gallon per minute output from this stage is then fed into a lead precipitation stage wherein the total of 4,193 lbs. of zinc metal are added as precipitant. The composition of the feed liquor to this step is:

| WT. % | | WT. LB. |
|---|---|---|
| 87.45 | $H_2O$ | 5,223,127 |
| 10.83 | $ZnCl_2$ | 646,875 |
| 0 | $FeCl_3$ | 0 |
| 1.42 | $FeCl_2$ | 84,699 |
| 0.30 | $PbCl_2$ | 17,839 |
| | | 5,972,540 |

Thereby, 13,291 lbs. of lead are produced as well as a total lead-free liquor having the following composition:

| WT. % | | WT. LB. |
|---|---|---|
| 87.59 | $H_2O$ | 5,223,127 |
| 10.99 | $ZnCl_2$ | 655,615 |
| 0 | $FeCl_3$ | 0 |
| 1.42 | $FeCl_2$ | 84,699 |
| | | 5,963,441 |

The output rate from the lead precipitation stage is approximately 414 GPM, which is split into two streams, one of about 45 GPM and one of about 269 GPM. The former lower rate stream is fed into an iron precipitation stage to which is added a total of 4,749 lbs. of zinc metal, thereby producing 4,057 lbs. of an iron metal product and an output flow of about 45 GPM which serves as the zinc catholyte feed, having a composition of:

| WT. % | | WT. LB. |
|---|---|---|
| 87.49 | $H_2O$ | 567,767 |
| 12.51 | $ZnCl_2$ | 81,166 |
| | | 648,933 |

The 369 GPM stream emanating from the lead precipitation stage is fed into the zinc anolyte cell. The zinc product from the zinc catholyte is 19,468 lbs. while the composition of the zinc catholyte is:

| WT. % | | WT. LB. |
|---|---|---|
| 93.33 | $H_2O$ | 567,767 |
| 6.67 | $ZnCl_2$ | 40,583 |
| | | 608,350 |

A portion of the Zn catholyte is led to the anolyte at a rate of about 42 GPM. Thus, the total feed into the zinc anolyte is 369+42 GPM=411 GPM. The chlorine transfer from the catholyte to the anolyte is 21,115 lbs. The combined output from the zinc anolyte is about 413 GPM and has a composition of:

| WT. % | LEACH LIQUOR | WT. LB. |
|---|---|---|
| 87.86 | $H_2O$ | 5,223,127 |
| 10.51 | $ZnCl_2$ | 624,931 |
| 1.63 | $FeCl_3$ | 96,606 |
| 0 | $FeCl_2$ | 0 |
| | | 5,944,664 | which serves as the leach liquor to be fed into the ore leaching stage.

EXAMPLE 3

Figure 10:
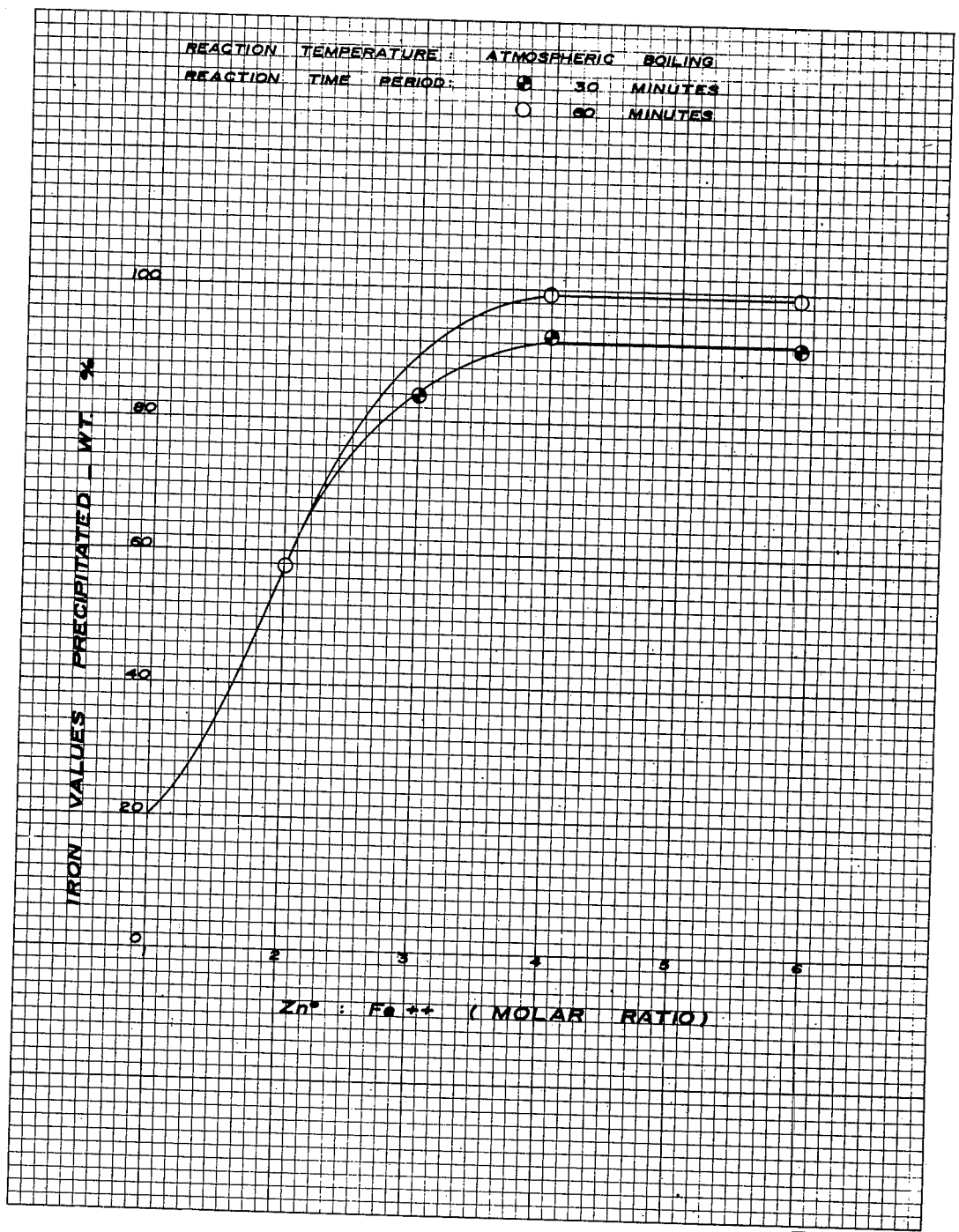
FIG. 10 demonstrates the dependence of the course of precipitation of iron from a solution containing the same using a precipitant of zinc powder, as a function of reaction time and $Zn°/Fe^{++}$ molar ratio.

Referring to FIGS. 10 and 12, a high carbonate content lead/zinc ore feed stock of the following composition was treated:

| FEED STOCK: 1,370 MTPD | | | |
|---|---|---|---|
| | Wt.% | | LB. MOL |
| | 7.84 | Zn | 3,623 |
| | 4.70 | Pb | 685 |
| | 0.17 | Cu | 81 |
| | 7.69 | Fe | 4,160 |
| (PPM) | 36. | Ag | 1.01 |
| (PPM) | 0.3 | Au | $46 \times 10^{-4}$ |
| | 0.02 | Cd | 5.37 |
| | 0.19 | Mn | 104 |
| | 3.82 | Mg | 4,747 |
| | 6.29 | Ca | 4,741 |
| | 18.85 | $CO_3$ | 9,488 |
| | 12.38 | S | 11,665 |
| | 38.05 | $H^+$ INSOL TOTAL | |

The ore had an average particle size of ⅜ inches. The following data is based upon obtaining a 100 MTPD zinc production at 95% extraction from the ore and a 98% recovery from solution.

The feed stock is introduced into a four-stage solubilization stage such as the one depicted in FIG. 12. The lead leaching stage consisted of four vats. The output from each of the vats was sequentially led into the next vat. The input to the first of these lead leaching vats was the output from the last of five zinc leaching vats. The output from each of these vats was sequentially led into the next zinc leaching vat. The input to the first zinc leaching vat was the output from the single vat acidulation stage.

The conditions in this leach section were as follows:

| PARTICLE SIZE: | —⅜ inch | —8 mesh | —100 mesh | —100 mesh |
|---|---|---|---|---|
| TEMPERATURE: | ambient | ambient | ambient | atm. boiling |
| REACTION TIME: | 120 days | 40 days | 3 days | 30 min. |

The extraction by vat section was as follows: wherein vats 1-4 were for the lead leaching stage, vats 5-9 were for the zinc leaching stage and vat 10 was for the acidulation stage.

| | % EXTRACTION BY VAT SECTION | | |
|---|---|---|---|
| | VATS 1-4 | VATS 5-9 | VAT 10 |
| Zn | 45 | 30 | 20 |
| Pb | 90 | 5 | 0 |
| Cu | 10 | 10 | 0 |
| Fe | 10 | 6 | 4 |
| Ag | 45 | 50 | 0 |
| Au | 45 | 50 | 0 |
| Cd | 80 | 15 | 0 |
| Mn | 80 | 15 | 0 |
| Mg | 80 | 20 | 0 |
| Ca | 80 | 20 | 0 |
| $CO_3$ | 80 | 20 | 0 |
| S | 0 | 10 | 0 |

While the liquor output from each of the vats is as described above, the solids output from each of the vats is in sequential flow in the opposite direction, such that the solids finally are treated in vat 10, i.e., the acidulation stage and subsequently in vat 11, a washing stage. The total leached and washed solids have the following composition:

| TO DISPOSAL (COMPOSITION) | | | EXTRACTED | |
|---|---|---|---|---|
| LB. MOL | WT. % | | WT. % | LB. MOL |
| 181 | 0.67 | Zn | 95 | 3,442 |
| 34 | 0.40 | Pb | 95 | 651 |
| 65 | 0.23 | Cu | 20 | 16 |
| 3,328 | 10.44 | Fe | 20 | 832 |
| 0.05 (PPM) | 3.3 | Ag | 95 | 0.96 |
| $2 \times 10^{-4}$ (PPM) | 0.015 | Au | 95 | $44 \times 10^{-4}$ |
| 0.27 (PPM) | 10 | Cd | 95 | 5.1 |
| 5.2 | 0.002 | Mn | 95 | 98.8 |
| 0 | 0 | Mg | 100 | 4,747 |
| 1,167 | 2.63 | Ca | 100 | 4,741 |
| 0 | 0 | $CO_3$ | 100 | 9,488 |
| 11,665 | 21.02 | S TOTAL | 10 | 4,946 |
| 3,780 | 6.81 | S° | — | — |
| | 64.60 | $H^+$ INSOL. | — | — |
| | (807 MTPD) | TOTAL | | |

The pregnant liquor emanating from the solubilization stage has the following composition:

| WT. % | | LB. MOL |
|---|---|---|
| 76.09 | $H_2O$ | 6,214,279 |
| 7.58 | NaCl | 190,804 |
| 5.02 | $CaCl_2$ | 66,596 |
| 5.72 | $MgCl_2$ | 88,444 |
| 3.94 | $ZnCl_2$ | 42,524 |
| 1.53 | $FeCl_2$ | 17,724 |
| 0.12 | $PbCl_2$ | 651 |
| 15 PPM | $CuCl_2$ | 16 |
| 1 PPM | AgCl | 0.96 |
| 6 PPM | $CdCl_2$ | 5.1 |
| (10,220 GPM) | TOTAL | |

This pregnant liquor is fed into the lead and minor metals precipitation stage wherein the temperature is ambient, the reaction time is 60 minutes and the number of stages is three. Therein, 673 lb. mol. of stabilized iron powder are added, thereby producing a lead product of the following composition:

| LEAD PRODUCT | | |
|---|---|---|
| WT. % | | LB. MOL |
| 98.75 | Lead | 651 |
| 0.75 | Copper | 16 |
| 0.08 | Silver | 0.96 |
| 0.42 | Cadmium | 5.1 |

-continued

| LEAD PRODUCT | |
|---|---|
| WT. % | LB. MOL |
| (61.9 MTPD) | | which is subsequently purified, and a lead-free liquor of the following composition:

| LEAD-FREE LIQUOR (TOTAL) | | |
|---|---|---|
| WT. % | | LB. MOL |
| 76.14 | $H_2O$ | 6,214,279 |
| 7.58 | NaCl | 190,804 |
| 5.03 | $CaCl_2$ | 66,596 |
| 5.73 | $MgCl_2$ | 88,444 |
| 3.94 | $ZnCl_2$ | 42,524 |
| 1.59 | $FeCl_2$ | 18,397 |
| (10,213. GPM TOTAL) | | |

9,378 GPM of this lead-free liquor are lead to the zinc cell anolyte for solution regeneration of ferric chloride and 835 GPM of this lead-free liquor is lead to the iron precipitation stage. In the solution regeneration stage, i.e., the zinc cell anolyte contributes 9,756 lb. mol of chlorine and the chlor-alkali cell (see later) contributes 7,137 lb. mol for a total of 271.6 MTPD. The amount of water from the zinc cell catholyte is 4,878 lb. mol (39.9 MTPD). As a result, the regenerated solution has a composition of:

| REGENERATED SOLUTION | | |
|---|---|---|
| WT. % | | LB. MOL |
| 75.82 | $H_2O$ | 5,710,894 |
| 7.54 | NaCl | 175,198 |
| 5.00 | $CaCl_2$ | 61,149 |
| 5.70 | $MgCl_2$ | 81,210 |
| 3.92 | $ZnCl_2$ | 39,046 |
| 2.02 | $FeCl_3$ | 16,893 | part of which is fed into the acidulation stage (vat 10) and part of which is fed into the lead leach stage (vat 4).

In the iron precipitation stage, 1,505 lb. mol of zinc metal dust (44.6 MTPD) is fed, thereby yielding 1,505 lb. mol of iron product (38.1 MTPD), which is subsequently fed into a stabilization stage. The iron precipitation step is carried out under a temperature of 100° C. for 60 minutes in one stage. The liquor produced in the iron precipitation stage has a composition of:

TABLE I

| IRON-FREE LIQUOR | | |
|---|---|---|
| WT. % | | LB. MOL |
| 76.05 | $H_2O$ | 508,263 |
| 7.57 | NaCl | 15,606 |
| 5.02 | $CaCl_2$ | 5,447 |
| 5.72 | $MgCl_2$ | 7,234 |
| 5.64 | $ZnCl_2$ | 4,983 |
| (836 GMP) TOTAL | | | which is fed to the zinc precipitation stage.

In the zinc precipitation stage, the iron-free liquor is reacted with a combinate liquor added thereto from the carbonator to be described below. The product of the zinc precipitation state is a zinc-free liquor having a composition of:

| ZINC-FREE LIQUOR (TOTAL) | | |
|---|---|---|
| WT. % | | LB. MOL |
| 84.21 | $H_2O$ | 825,993 |
| 8.39 | NaCl | 25,361 |
| 3.42 | $CaCl_2$ | 5,447 |
| 3.90 | $MgCl_2$ | 7,234 |
| 0.08 | $ZnCl_2$ | 105 |
| (1,227 GPM) TOTAL | | | and 4,878 lb. mol of a zinc carbonate cake (277.4 MTPD). The zinc carbonate cake is fed into the zinc carbonate dissolution stage wherein it is reacted with hydrogen chloride which is added thereto from the hydrogen chloride unit to be discussed subsequently. The zinc carbonate dissolution stage is carried out at 40° C. (heat not added) for a reaction time of 30 minutes in a single stage. Also added to the zinc carbonate dissolver is recycled zinc cell catholyte (738 GPM) total having a composition of:

| ZINC CELL CATHOLYTE (TO DISSOLVER) | | |
|---|---|---|
| WT. % | | LB. MOL |
| 74.98 | $H_2O$ | 442,283 |
| 25.02 | $ZnCl_2$ | 19,511 |

The composition of the zinc cell catholyte returning from the zinc carbonate dissolver to the zinc cell catholyte is (784 GPM):

| ZINC CELL CATHOLYTE (TO CELL) | | |
|---|---|---|
| WT. % | | LB. MOL |
| 70.80 | $H_2O$ | 447,161 |
| 29.20 | $ZnCl_2$ | 24,389 |

The product of the zinc cell catholyte electrolysis is 4,878 lb. mol of zinc (144.6 MTPD) which is subsequently led to the zinc melter. 9,756 lb. of chlorine (156.8 MTPD) and 4,878 lb. mol of water (39.9 MTPD) is fed as a source of chloride to the zinc cell anolyte from the zinc cell catholyte.

The carbonate liquor provided to the zinc precipitation stage is derived from the caustic chlorine cells. The source of the sodium chloride required for this electrolysis is the output from the calcium/magnesium precipitation stage to be subsequently described. The chlor-alkali cell catholyte yields a sodium hydroxide liquor of the following composition:

| SODIUM HYDROXIDE LIQUOR | | |
|---|---|---|
| WT. % | | LB. MOL |
| 93.62 | $H_2O$ | 864,254 |
| 6.38 | NaOH | 26,536 | which is subsequently fed to the carbonator. The chlorine gas produced at the chlor-alkali cell anolyte is fed to the solution regeneration stage as previously mentioned and also to the HCl production unit to be described below (19,399 lb. mol, i.e., 311.9 MTPD, for a total chlorine gas production of 26,536 lb. mol (426.6 MTPD)). The hydrogen gas produced at the chlor-alkali cell catholyte is also fed into the hydrogen chloride production unit (19,399 lb. mol (8.89 MTPD), the balance being 7,137 lb. mol for a total of 26,536 lb. mol (12.15 MTPD)). The HCl produced in the hydrogen chloride unit is fed partly into the acidulation vat and partly into the zinc carbonate dissolver. 9,756 lb. mol of HCl (161.3 MTPD) is dissolved in the catholyte stream emanating from the zinc cell catholyte to the zinc carbonate dissolver. The hydrogen chloride being fed to the acidulation stage (9,643 lb. mol, 159.5 MTPD) is added thereto by its dissolution into the zinc-free recycle liquor being fed to the zinc acidulation stage as described below.

The sodium hydroxide liquor is added to the carbonator in combination with 13,268 lb. mol (264.8 MTPD) of $CO_2$. Therein, water can be evaporated as required. The product of the carbonation is as follows:

| CARBONATE LIQUOR | | |
|---|---|---|
| LB. MOL | WT % | |
| 864,254 | 91.72 | $H_2O$ |
| 13,268 | 8.28 | $Na_2CO_3$ |

Of this, 434 GPM are fed to the zinc precipitation stage and 746 GPM are fed into the calcium plus magnesium precipitation stage.

For the latter stage, the input is 805 GPM of the zinc-free liquor emanating from the zinc precipitation stage in addition to the carbonate liquor (the remainder of the zinc-free liquor (422 GPM) is fed into the acidulation vat where it has HCl added thereto prior to its entry into the acidulation stage, as mentioned above. In the calcium/magnesium precipitation stage, the product is a waste cake of the following composition:

| $CaCO_3 + MgCO_3$ CAKE | | |
|---|---|---|
| WT. % | | LB. MOL |
| 1.13 | $ZnCO_3$ | 69 |
| 46.66 | $CaCO_3$ | 3,574 |
| 52.21 | $MgCO_3$ | 4,747 |
| | (347.7 MTPD) TOTAL | | as well as a sodium chloride liquor of a composition:

| SODIUM CHLORIDE LIQUOR (TOTAL) | | |
|---|---|---|
| WT. % | | LB. MOL |
| 90.94 | $H_2O$ | 1,088,565 |
| 9.06 | NaCl | 33,423 |
| | (1,498 GPM) TOTAL | |

Of the latter liquor, 309 GPM is fed into the washing vat into which the solid products remaining from the acidulation vat 10 are fed. The liquor emanating from this washing stage is used as part of the feed to the acidulation stage. The remainder of the sodium chloride liquor emanating from the calcium/magnesium precipitation stage (1189 GPM) is used as the feed to the chlor-alkali cell catholyte.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A chemical, electro-chemical process for recovering metal values from a zinc- or lead-containing material comprising:

in a solubilization stage, oxidizing the zinc- or lead-containing material by treating said material with a ferric chloride leach solution until there is substantial solubilization of the zinc or lead content of the material into said solution in the form of zinc or lead chloride, thereby also reducing ferric chloride to ferrous chloride and forming a pregnant liquor;

when solubilized lead is present, separating it from the pregnant liquor forming an essentially lead free solution and recovering the separated lead;

dividing this essentially lead free solution into two portions;

passing one portion of the essentially lead free solution into the anolyte compartment of a $Zn°$ producing electrolysis stage for use as the ferrous ion-containing anolyte thereof;

separating iron from the second portion of the essentially lead free solution, forming an essentially iron free solution;

passing the essentially iron free solution into the catholyte compartment of said $Zn°$ producing electrolysis stage for use as the catholyte thereof;

conducting electrolysis in said $Zn°$ producing electrolysis stage, thereby regenerating ferric chloride leach solution in the anolyte by oxidizing ferrous ions to ferric ions, and reducing zinc ions in the catholyte to $Zn°$; and recovering the $Zn°$ produced in the electrolysis stage.

2. The process of claim 1 which further comprises recycling the solutions emanating from the anolyte and catholyte compartments of the $Zn°$ producing electrolysis stage, into the oxidizing step of the solubilization stage.

3. The process of claim 1 wherein the lead is separated from the pregnant liquor by precipitation with a metal less noble than lead.

4. The process of claim 3 wherein the less noble metal precipitant is iron.

5. The process of claim 1 wherein iron is separated from the essentially lead free solution by precipitation with a metal less noble than iron.

6. The process of claim 5 wherein the less noble metal precipitant is zinc.

7. The process of claim 1 wherein the zinc- or lead-containing material is a sulfide ore thereof.

8. The chemical, electro-chemical process for recovering metal values from a zinc sulfide or lead sulfide containing material of claim 1 comprising:

(a) in a solubilization stage, oxidizing the zinc- or lead-containing material by treating said material with a ferric chloride leach solution until there is substantial solubilization of the zinc or lead content of the material into said solution in the form of zinc or lead chloride, thereby also reducing ferric chloride to ferrous chloride and forming a pregnant liquor;

(b) separating solubilized lead from the pregnant liquor as $Pb°$ by precipitation with metallic iron, thereby forming an essentially lead free solution;

(c) passing a portion of the essentially lead-free solution from (b) into the anolyte compartment of a $Zn°$ producing electrolysis stage for use as the ferrous ion-containing anolyte thereof;

(d) separating iron as Fe° from the remainder of the essentially lead-free solution from (b) by precipitation with metallic zinc thereby forming an essentially iron free solution;

(e) passing the essentially iron free solution from (d) into the catholyte compartment of said Zn° producing electrolysis stage for use as the catholyte thereof;

(f) conducting electrolysis in said Zn° producing electrolysis stage, thereby regenerating ferric chloride leach solution in the anolyte by oxidizing ferrous ions to ferric ion, and reducing zinc ions in the catholyte to Zn°;

(g) recovering the Zn° produced in the electrolysis stage; and (h) recycling the solutions emanating from the anolyte and catholyte compartments of the Zn° producing electrolysis stage, into the oxidizing step of solubilization stage (a).

9. The process of claim 8 wherein the solubilization stage is conducted by counterflow of the zinc sulfide or lead sulfide containing material and the ferric chloride leach solution.

10. The process of claim 1 wherein the leaching in the solubilization stage is conducted at ambient temperature using stirred reactors.

11. The process of claim 8 wherein the precipitation of iron by zinc is conducted at the atmospheric boiling point of the essentially lead-free solution.

12. The process of claim 1 wherein the zinc electrolysis stage is conducted in a diaphragm equipped electrolysis cell in which the cathode member upon which the metallic zinc deposits is a circular rotating plate equipped with mechanical scrapers for removal of the zinc deposits.

13. The process of claim 1 wherein the temperature in the solubilization stage is approximately at the atmospheric boiling point of the leached solution.

14. The process of claim 1 wherein the solubilization stage is conducted at a temperature greater than the atmospheric boiling point of the leach solution and the stage is conducted in a sealed reactor at elevated pressure.

15. The process of claim 14 wherein the temperature is approximately 140° C. and the pressure is about 40–50 psi.

16. The process of claim 8 wherein the metallic iron used to precipitate lead in step b is obtained from the iron which is precipitated in iron removal step d; and the zinc used to precipitate iron in step d is obtained from the zinc recovered in the electrolysis stage of step g.

17. The process of claim 3 wherein the material from which the metal values are recovered further comprises minor metals other than zinc or lead which metals are more noble than the precipitant used to precipitate lead in the lead removal step, whereby these minor metals are also precipitated.

18. The process of claim 8 wherein the zinc sulfide or lead sulfide containing material further comprises minor metals of cadmium, copper, silver, arsenic or antimony and the minor metal content is removed from the pregnant liquor by precipitation with metallic iron.

19. The process of claim 18 wherein at least one of said minor metals is removed by precipitation with iron prior to the lead removal step b.

20. The process of claim 4 in which the iron precipitant is finely divided iron powder.

21. The process of claim 8 wherein the portion of the essentially lead-free solution to be passed into the anolyte compartment is subjected to a sulfate removal step by reaction with an oxygen-containing gas at a temperature of 85°–120° C., thereby forming a sulfate-containing solid; the thus-formed solid is removed from the liquor; and the sulfate-depleted liquor is then passed into the anolyte compartment.

22. The process of claim 21 wherein the oxygen-containing gas is air.

23. The process of claim 8 wherein, prior to recycling of the depleted catholyte solution per step h, a portion of the catholyte solution is treated with an alkali metal carbonate, thereby precipitating zinc carbonate; the separated zinc carbonate is resolubilized by treatment with hydrochloric acid; and the solution containing the resolubilized zinc is added to the catholyte solution being recycled to the oxidizing step of solubilization stage a.

24. The process of claim 23 wherein the alkali metal carbonate is sodium carbonate.

25. The process of claim 7 wherein the ore is a pre-concentrated ore.

26. The process of claim 1 wherein the zinc or lead-containing material further comprises carbonates of calcium or magnesium and said process comprises (a) in a multi-step solubilization stage, (i) oxidizing the zinc- or lead-containing material by treating said material with a ferric chloride leach solution until there is substantial solubilization of the zinc or lead content of the material into said solution in the form of zinc or lead chloride, thereby also reducing ferric chloride to ferrous chloride and forming a pregnant liquor, and simultaneously also solubilizng said calcium and magnesium carbonates into said solution, thereby forming soluble calcium and magnesium chlorides and insoluble hydrated ferric oxide solid; (ii) separating the latter solid from the resultant solution; (iii) solubilizng the separated solid by treating it with acid thereby forming a ferric ion-containing solution and insoluble solids; and (iv) using the ferric ion solution from (iii) as at least part of the leach solution in (i);

(b) separating solubilized lead from the pregnant liquor, thereby forming an essentially lead-free solution;

(c) passing a portion of the essentially lead-free solution from (b) into the anolyte compartment of a Zn° producing electrolysis stage for use as the ferrous ion-containing anolyte thereof;

(d) separating iron from the remainder of the essentially lead-free solution from (b) thereby forming an essentially iron-free solution;

(e) selectively separating zinc from the essentially iron free solution by treating it with an alkali metal carbonate thereby precipitating zinc as a zinc carbonate solid and forming an essentially zinc-free solution;

(f) separating the zinc carbonate solid from said essentially zinc-free solution;

(g) resolubilizing the zinc carbonate by treatment with hydrochloric acid forming a zinc chloride containing solution;

(h) passing the latter zinc chloride-containing solution into the catholyte compartment of said Zn° producing electrolysis stage for use as the catholyte thereof;

(i) conducting electrolysis in said Zn° producing electrolysis stage, thereby regenerating ferric chloride leach solution in the anolyte by oxidizing ferrous ions to ferric ion, and reducing zinc ions in the catholyte to Zn°;

(j) recovering the Zn° produced in the electrolysis stage; and (k) separating calcium and magnesium from the zinc-free solution formed in (e) by treating it with an alkali metal carbonate thereby forming insoluble calcium and magnesium carbonates and an essentially calcium-, magnesium- and zinc-free solution; and (l) recycling the calcium-, magnesium- and zinc-free solution back to the solubilization stage (a).

27. The process of claim 26 wherein the multi-step solubilization stage (a) comprises an oxidizing step (i) which, in turn, comprises at least two leaching steps, the first one of which solubilizes primarily lead; and which further comprises, after acidulation step (iii), separating the ferric ion-containing solution from the insoluble solids formed in step (iii) and washing the separated solids with the solutions recycled from step (1), thereby forming a solution which is recycled to step a(i) or a(iii), of the solubilization stage, and a waste solid.

28. The process of claim 26 wherein the acidulation step (iii) of the solubilization stage (a) is effected using hydrochloric acid.

29. The process of claim 26 wherein lead is separated from the pregnant liquor in step (b) by precipitation therefrom using metallic iron as the precipitant.

30. The process of claim 26 wherein iron is separated from the lead-free solution in step (d) by precipitation therefrom using metallic zinc as the precipitant.

31. The process of claim 26 wherein the alkali metal carbonate precipitant is sodium carbonate.

32. The process of claim 26 wherein calcium and magnesium carbonates are coprecipitated in step (k).

33. The process of claim 26 wherein calcium is selectively precipitated in the form of calcium carbonate prior to the precipitation of magnesium, in the form of magnesium carbonate in step (k).

34. The process of claim 28 wherein a caustic chlorine electrolysis stage is incorporated to provide a source of HCl and alkali metal hydroxide, the HCl being utilized in the acidulation step of solubilization stage (a) and in zinc carbonate resolubilization step (g), and the alkaline metal hydroxide subsequently being reacted with carbon dioxide to form the souce of the alkali metal carbonate utilized in carbonate precipitation steps (e) and (k).

35. The process of claim 34 wherein the electrolyte formed in the caustic chlorine electrolysis salt is provided by recycling a portion of the zinc-, calcium- and magnesium-free solution from step (k), said solution containing alkali metal chloride;

and the process further comprising conducting electrolysis in the caustic chlorine cell, thereby producing chlorine gas at the anode and alkali metal hydroxide and hydrogen gas at the cathode, which latter products are produced by reaction of water with the alkali metal formed at the cathode by reduction of the alkali metal cation;

reacting the hydrogen and chlorine gases so produced in a hydrogen chloride reactor to produce HCl;

recycling the depleted zinc cell catholyte back into the catholyte and adding to the recycled catholyte a portion of the HCl gas produced in the HCl unit, thereby forming hydrochloric acid;

adding the zinc carbonate from step (f) to the recycling hydrochloric acid-containing catholyte, thereby resolubilizing the zinc carbonate per step (g);

adding the remaining portion of the HCl gas from the HCl reactor to step (iii) of solubilization stage (a), thereby forming hydrochloric acid used to resolublize the hydrated ferric oxide solid;

reacting the alkali metal hydroxide formed in the caustic chlorine cell with carbon dioxide, thereby forming an alkali metal carbonate-containing solution;

and adding a portion of this alkali metal carbonate-containing solution to the iron-free solution in step (e) in order to selectively separate zinc; and recycling the remaining portion of the alkali metal carbonate-containing solution to calcium and magnesium carbonate precipitation step (k).

36. The process of claim 35 wherein the alkali metal is sodium.

37. The process of claim 29 wherein the material from which the metal values are recovered further comprises minor metals other than zinc or lead which metals are more noble than the precipitant used to precipitate lead in the lead removal step, whereby these minor metals are also precipitated.

38. The process of claim 35 wherein the carbon dioxide reactant is derived from fossil fuel.

39. The process of claim 26 wherein the zinc- or lead-containing material is a sulfide ore of zinc and lead.

40. The process of claim 26 wherein the portion of the essentially lead-free solution to be passed into the anolyte compartment is subjected to a sulfate removal step by reaction with an oxygen-containing gas at a temperature of 85°–120° C., thereby forming a sulfate-containing solid; the thus-formed solid is removed from the liquor; and the sulfate-depleted liquor is then passed into the anolyte compartment.

41. The process of claim 1 wherein the oxidizing reaction in the solubilization stage is conducted for a period of time sufficiently short that substantial solubilization of the lead content of the treated material is accomplished and, simultaneously, only minimal solubilization of the zinc content thereof occurs.

42. The process of claim 1, wherein iron is separated from said second portion of the essentially lead free solution by introducing the latter into an electrolysis cell where metallic iron is recovered and ferric chloride is regenerated in said solution by electrolysis of the ferrous chloride-containing electrolyte;

and wherein said solution is then passed into the catholyte compartment of said Zn° producing electrolysis stage.

* * * * *